United States Patent
Li et al.

(10) Patent No.: US 8,670,357 B2
(45) Date of Patent: Mar. 11, 2014

(54) METHODS AND APPARATUS FOR CONTROLLING PEER TO PEER COMMUNICATIONS

(75) Inventors: Junyi Li, Chester, NJ (US); Shailesh Patil, Bridgewater, NJ (US); Hua Wang, Bridgewater, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 13/009,534

(22) Filed: Jan. 19, 2011

(65) Prior Publication Data

US 2012/0182907 A1 Jul. 19, 2012

(51) Int. Cl.
*H04J 3/00* (2006.01)

(52) U.S. Cl.
USPC ........... 370/280; 370/276; 370/277; 370/310; 370/328; 370/329

(58) Field of Classification Search
None
See application file for complete search history.

(56) References Cited

U.S. PATENT DOCUMENTS

| | | | |
|---|---|---|---|
| 7,548,758 B2* | 6/2009 | Periyalwar et al. | 455/517 |
| 8,412,103 B2* | 4/2013 | Srinivasan et al. | 455/63.1 |
| 2007/0121531 A1 | 5/2007 | Lee et al. | |
| 2008/0002658 A1 | 1/2008 | Soliman | |
| 2008/0069039 A1* | 3/2008 | Li et al. | 370/329 |
| 2008/0069063 A1 | 3/2008 | Li et al. | |
| 2009/0010186 A1* | 1/2009 | Li et al. | 370/310 |
| 2009/0016363 A1* | 1/2009 | Laroia et al. | 370/401 |
| 2009/0017838 A1* | 1/2009 | Laroia et al. | 455/456.1 |
| 2010/0169498 A1* | 7/2010 | Palanki et al. | 709/228 |
| 2011/0255450 A1* | 10/2011 | Wang et al. | 370/280 |
| 2013/0114494 A1* | 5/2013 | Yuk et al. | 370/312 |
| 2013/0178221 A1* | 7/2013 | Jung et al. | 455/450 |

FOREIGN PATENT DOCUMENTS

| | | |
|---|---|---|
| WO | WO2005060182 A1 | 6/2005 |
| WO | WO 2005060182 A1 * | 6/2005 |

OTHER PUBLICATIONS

P. Omiyi, et al., "Maximising spectral efficiency in 3G with hybrid ad-hoc UTRA TDD/UTRA FDD cellular mobile communications", Spread Spectrum Techniques and Applications, 2004 IEEE Eighth International Symposium on, IEEE, Aug. 30-Sep. 2, pp. 613-617. ISBN/ISSN 0-7803-8408-3 (2004).
International Search Report and Written Opinion—PCT/US2012/021774—ISA/EPO—Mar. 27, 2012.

(Continued)

*Primary Examiner* — Hassan Kizou
*Assistant Examiner* — Amy Ling
(74) *Attorney, Agent, or Firm* — James K. O'Hare

(57) ABSTRACT

A wireless communications system supports both cellular communications and direct peer to peer communications. The cellular communications use FDD downlink and uplink bands for control and traffic signaling. An access point employs control over direct peer to peer communications. Peer to peer mode control signals from the access point are transmitted to wireless terminals using the FDD cellular downlink band. Peer to peer mode control signals from wireless terminals are transmitted to an access point using the FDD cellular uplink band. Peer to peer traffic signals between wireless terminals are communicated using a TDD band. In one embodiment, the access point communicates priority information to peer to peer network wireless terminals, and the wireless terminals make peer to peer traffic transmission decisions in a decentralized manner using the received priority information. In another embodiment, the access point directly schedules peer to peer traffic in the peer to peer network.

30 Claims, 18 Drawing Sheets

(56) References Cited

OTHER PUBLICATIONS

Peng, et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660.

* cited by examiner

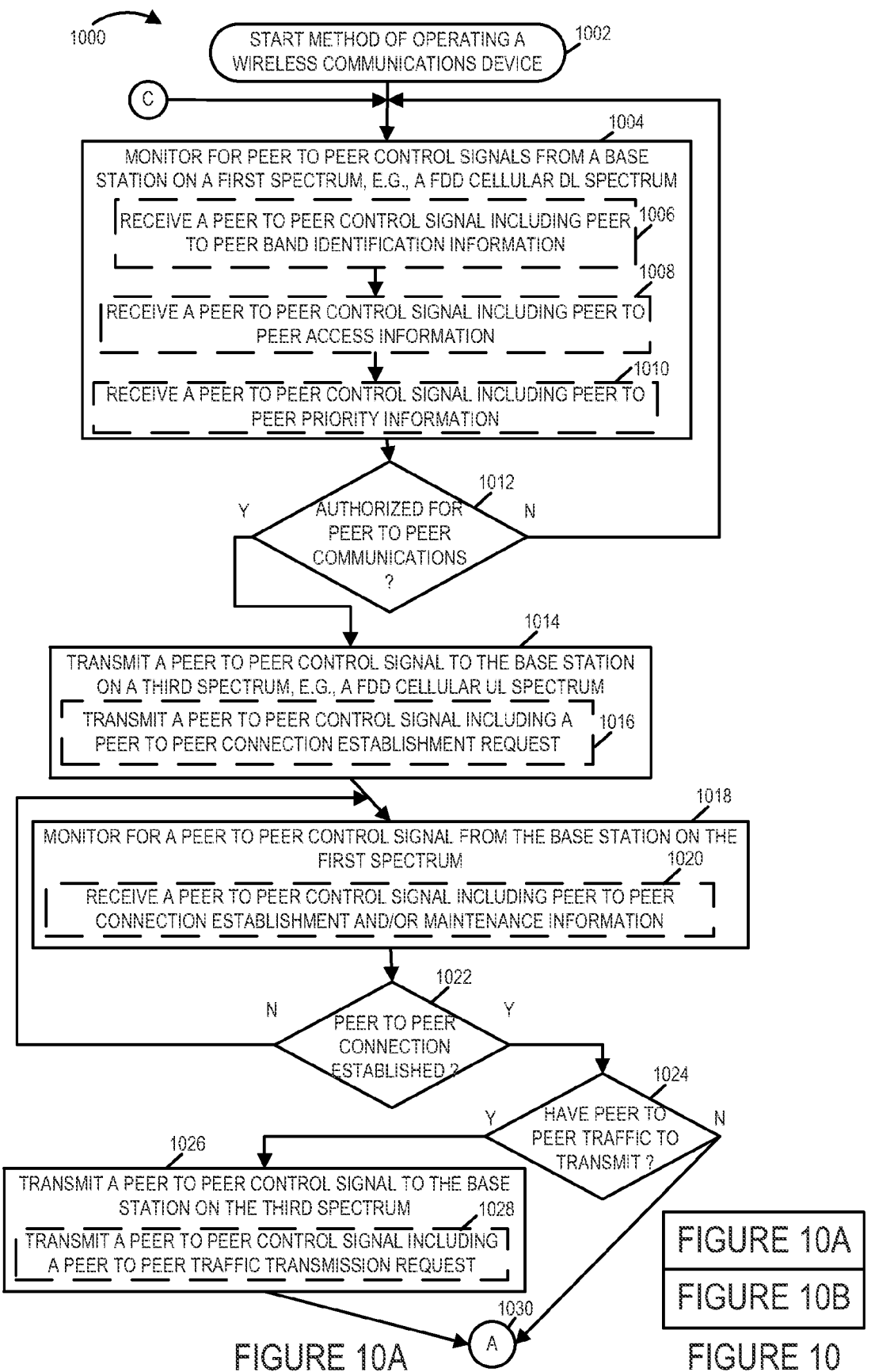

| FIGURE 12A | FIGURE 12B |

METHODS AND APPARATUS FOR CONTROLLING PEER TO PEER COMMUNICATIONS

FIELD

Various embodiments relate to wireless communications, and more particularly, to methods and apparatus for controlling peer to peer communications.

BACKGROUND

In a wide area network (WAN)/cellular scenario, communications between mobile devices are via the uplink/downlink channels between mobiles and base stations. In such a case, communication between mobiles is routed through a base station. In the case that two communicating mobiles are in the vicinity of each other, direct peer to peer communication without going through a base station may be possible and has the potential to reduce base station loading.

Typical WAN deployments are in one of two modes, FDD (Frequency Division Duplexing) in which different frequency bands are used for uplink and downlink communications and TDD (Time Division Duplexing) in which the same frequency band is used for uplink and downlink communications but at different times. Due to implementation issues, FDD is the preferred method of deployment in many situations, particularly cellular systems, since the devices in FDD spectrum do not have to switch between transmitting and receiving in the same spectrum.

In contrast to WAN/Cellular communications, peer to peer communication is typically short distance and is not usually power limited. Additionally, since peer to peer communication tends, by its nature, to be symmetrical, peer to peer communications is well suited for TDD methods of communication.

In view of the above discussion, it should be appreciated that it would be desirable if methods and apparatus could be developed which would allow devices to perform WAN communications using FDD but peer to peer traffic communications using TDD signaling.

SUMMARY

Various embodiments are directed to ways that WAN/cellular system can be deployed in an FDD spectrum, while peer to peer communications takes place using a portion of spectrum allocated for TDD signaling. In accordance with some embodiments, a device or devices in the WAN/cellular network, e.g., access points such as base stations and/or network control devices, send control signals using the FDD spectrum to enable and/or control peer to peer communication taking place in TDD spectrum. In one such implementation there are three distinct non-overlapping communications bands being used: an FDD uplink band, an FDD downlink band and a TDD band. The TDD band is used for peer to peer communications.

In various embodiments, a device or devices in the WAN/cellular network, e.g., an access point such as a base station, employs some level of control over direct peer to peer communications between mobile wireless devices. In different embodiments, the level of control over the peer to peer communication may be different. For example, in one embodiment, an access point, e.g., base station, in the WAN suggests which mobiles can use peer to peer communication and then those mobiles can participate in a peer to peer style connection scheduling mechanism wherein peer to peer signal transmission decisions may be made in a distributed manner by the mobiles participating in peer to peer communications. In another embodiment, an access point, e.g., base station, in the WAN commands which mobiles are to use peer to peer communication and then those mobiles participate in a peer to peer style connection scheduling mechanism wherein peer to peer signal transmission decisions are made in a distributed manner by the mobiles participating in peer to peer communications. In some embodiments, an access point, e.g. base station, in the WAN controls priorities being used by the wireless communications devices, e.g., mobile wireless terminals, participating in peer to peer communications, e.g., on a device and/or on per link basis, and the peer to peer devices compete for communications resources, e.g., the right to use peer to peer traffic segments, as part of a distributed connection scheduling process. The priority associated with an individual peer to peer device set by the base station can, and in some embodiments does, affect the peer to peer device's ability to gain access to communications resources. In still another example, an access point, e.g., a base station in the WAN directly controls scheduling in the peer to peer network, e.g., directly schedules peer to peer traffic segments to mobile wireless terminals.

An exemplary method of operating a wireless communications device, in accordance with some embodiments, comprises: receiving a first control signal from a base station on a first spectrum; and determining whether or not to send a peer to peer communications signal to a second wireless device in a second spectrum based on said first control signal, said second spectrum being different from said first spectrum. The exemplary method further comprises sending a second control signal to the base station on a third spectrum, said third spectrum being different than first and second spectrum. A wireless communications device, in accordance with some embodiments, comprises: at least one processor configured to: receive a first control signal from a base station on a first spectrum; determine whether or not to send a peer to peer communications signal to a second wireless device in a second spectrum based on said first control signal, said second spectrum being different from said first spectrum; and send a second control signal to the base station on a third spectrum, said third spectrum being different than first and second spectrum. The exemplary wireless communications device further comprises memory coupled to said at least one processor.

An exemplary method of operating an access point, e.g., a base station, in accordance with some embodiments, comprises: transmitting a first infrastructure mode control signal in a first frequency band to a first wireless terminal; transmitting a first peer to peer mode control signal in said first frequency band to a second wireless terminal; receiving a second infrastructure mode control signal in a second frequency band from said first wireless terminal while said first wireless terminal is operating in an infrastructure mode of operation; and receiving a second peer to peer mode control signal in said second frequency band from said second wireless terminal while said second wireless terminal is operating in a peer to peer mode of operation. An exemplary access point, in accordance with some embodiments, comprises: at least one processor configured to: transmit a first infrastructure mode control signal in a first frequency band to a first wireless terminal; transmit a first peer to peer mode control signal in said first frequency band to a second wireless terminal; receive a second infrastructure mode control signal in a second frequency band from said first wireless terminal while said first wireless terminal is operating in an infrastructure mode of operation; and receive a second peer to peer mode control signal in said second frequency band from said second wireless terminal while said second wireless terminal is operating in a peer to peer mode of operation. The exemplary access point further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 10A is a first part of a flowchart of an exemplary method of operating a wireless communications device in accordance with an exemplary embodiment.

DETAILED DESCRIPTION

Figure 1:
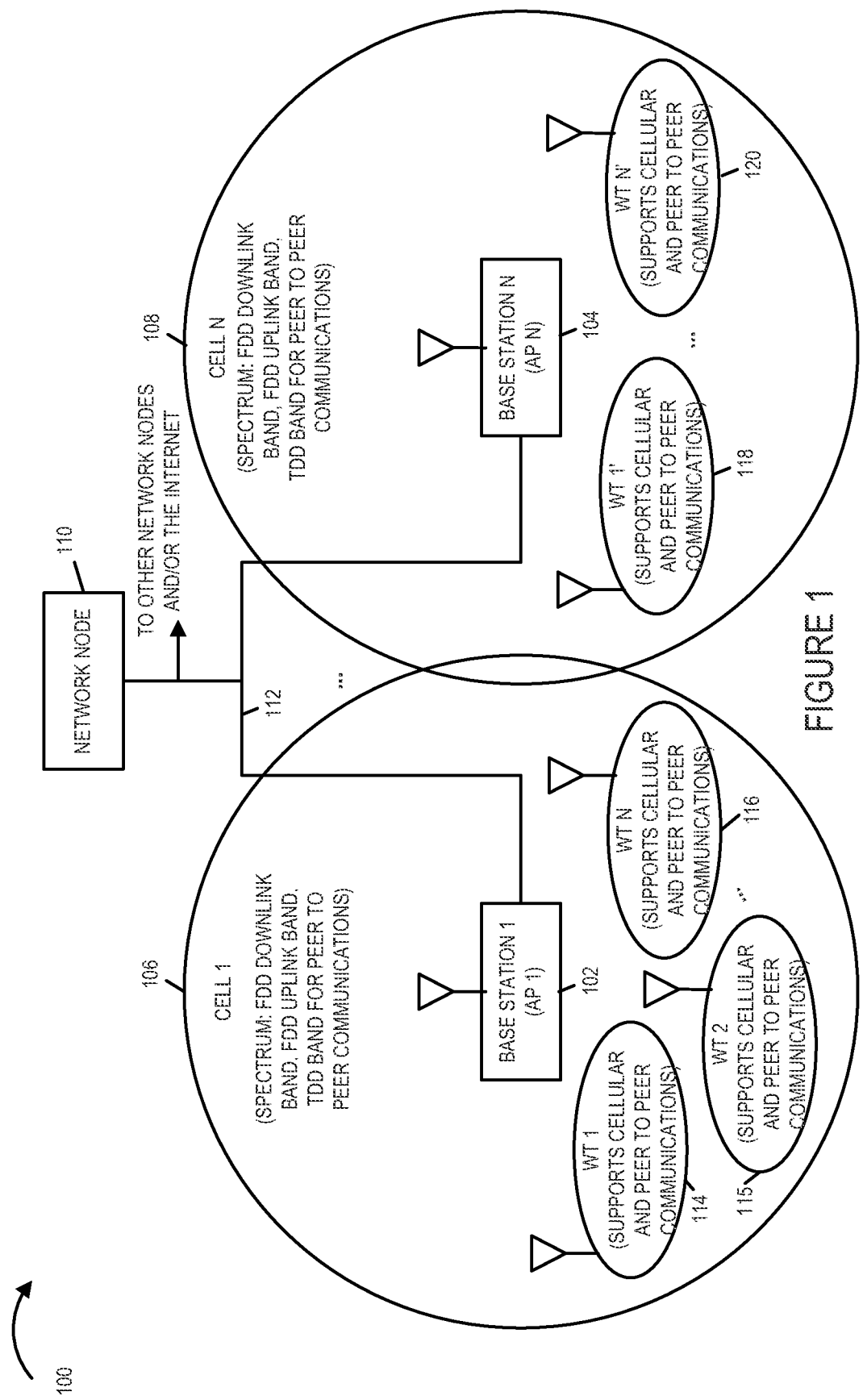
FIG. 1 is a drawing of an exemplary communications system in accordance with an exemplary embodiment.

FIG. 1 is a drawing of an exemplary communications system 100 in accordance with an exemplary embodiment. Exemplary communications system 100 supports both cellular communications and direct peer to peer communications. Communications system 100 includes a plurality of base stations (base station 1 102, . . . , base station N 104), each with a corresponding cellular coverage area (cell 1 106, . . . , cell N 108). The base stations (102, . . . , 104) are coupled together and to other network nodes including network node 110 and/or to the Internet via backhaul network 112. Exemplary communications system 100 also includes a plurality of wireless terminals, e.g., mobile nodes, which may move throughout the system and communicate with the base stations and other wireless terminals. As shown in FIG. 1, wireless terminals (wireless terminal 1 114, wireless terminal 2 115, . . . , wireless terminal N 116) are located within cell 1 106, and wireless terminals (wireless terminal 1' 118, . . . , wireless terminal N' 120) are located within cell N 108. At a different time, different wireless terminals may be situated within the cells (106, . . . , 108). In this example, each of the wireless terminals (WT 1 114, WT 2 115, . . . , WT N 116, WT 1' 118, . . . , WT N' 120) support both cellular and direct peer to peer communications. In some embodiments at least some of the wireless terminals support cellular based communications and at least some of the wireless terminals support direct peer to peer communications.

In this example, within the region of cell 1 106, the spectrum used for wireless communications includes an FDD downlink band, an FDD uplink bank and a TDD band for peer to peer communications. In some such embodiments, the FDD downlink band, the FDD uplink band, and the TDD band for peer to peer communication corresponding to cell 1 106 are non-overlapping bands. In some embodiments, there are a plurality of alternative peer to peer bands used within cell 1 106. Cellular downlink signals including cellular control signal and cellular peer to peer traffic signals are transmitted from base station 1 102 to one or more of wireless terminals (114, 115, . . . , 116) in the FDD downlink band. In addition, peer to peer control signals are transmitted from the base station 1 102 to one or more of wireless terminals (114, 115, . . . , 116) in the FDD downlink band. In some embodiments, the peer to peer control signals communicated in the downlink band include one or more or all of: peer to peer spectrum information, peer to peer communications priority information, and peer to peer traffic scheduling information. In various embodiments, at least some of the peer to peer control signals communicated in the downlink band are unicast signals.

Cellular uplink signals including cellular control signal and cellular peer to peer traffic signals are transmitted from one or more of wireless terminals (114, 115, . . . , 116) to base station 1 102 in the FDD uplink band. In addition, peer to peer control signals are transmitted from one or more of wireless terminals (114, 115, . . . , 116) to base station 1 102 in the FDD uplink band. In some embodiments, the peer to peer control signals communicated in the uplink band include one or more or all of: peer to peer communications resource utilization information, peer to peer communications backlog information, power information, and interference information.

Direct peer to peer signals including peer to peer traffic signals are communicated between pairs of wireless terminals (114, 115, . . . , 116) in the TDD band. In some embodiments, the peer to peer signals communicated in the TDD peer to peer band include one or more or all of: peer to peer discovery signals, peer to peer traffic scheduling signals, and peer to peer traffic signals.

Similarly, within the region of cell N 108, the spectrum used for wireless communications includes an FDD downlink band, an FDD uplink bank and a TDD band for peer to peer communications. In some embodiments, at least some same types of bands corresponding to adjacent cells are different, e.g., to reduce interference.

Figure 2:
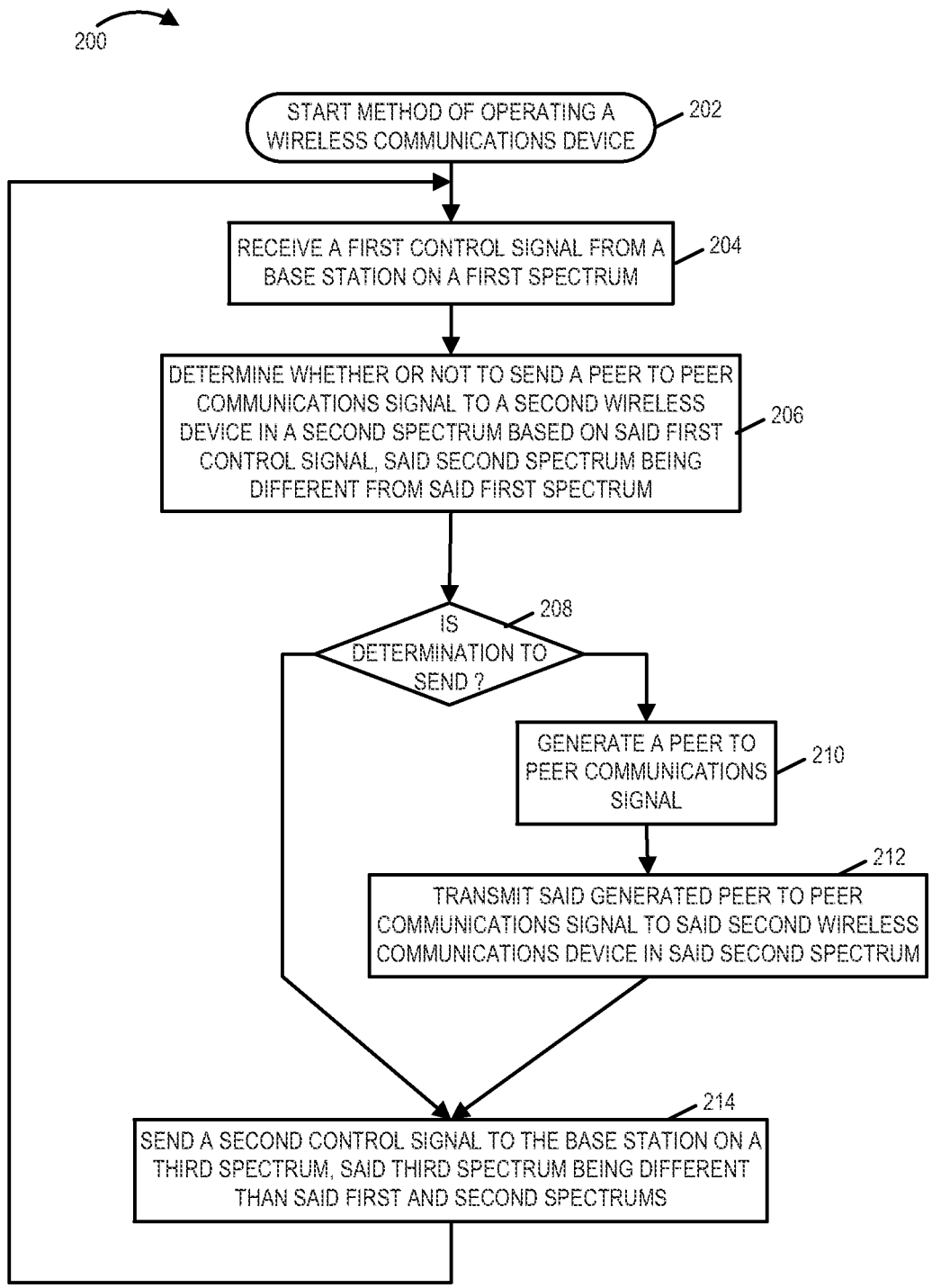
FIG. 2 is a flowchart of an exemplary method of operating a wireless communications device in accordance with an exemplary embodiment.

FIG. 2 is flowchart 200 of an exemplary method of operating a wireless communications device in accordance with an exemplary embodiment. The exemplary wireless communications device implement the method of flowchart 200 of FIG. 2 is, e.g., one of the mobile wireless terminals (114, 115, . . . , 116, 118, . . . , 120) of system 100 of FIG. 1. Operation starts in step 202 where the wireless communications device is powered on and initialized. Operation proceeds from start step 202 to step 204, in which the wireless communications device receives a first control signal from a base station on a first spectrum. In some embodiments, the base station is part of a cellular network and the first control signal from the base station provides peer to peer communications priority information. In some embodiments, the priority information corresponds to an individual device or user. In some embodiments, the priority information corresponds to a peer to peer communications link. In some embodiments, the peer to peer communications link priority information is for a unidirectional link. In some embodiments, the peer to peer communications link priority information is for a bi-directional link.

In some embodiments, the first control signal is a unicast signal directed to the wireless communications device. In some embodiments, the first control signal conveys information identifying a TDD spectrum to be used for peer to peer communications, e.g., identifying one of a plurality of alternative TDD spectrums which may be used for peer to peer communications. In some embodiments, the first control signal conveys a suggestion that the wireless communications device use peer to peer communications. In some embodiments, the first control signal conveys a command that the wireless communications device use peer to peer communications. In various embodiments, the first control signal conveys a command that the wireless communications device switch from using cellular based communications to using peer to peer communications. In some embodiments, the first control signal communicates peer to peer authorization information. In some embodiments, the first control signal communicates information which allows the wireless communications device to use peer to peer communications. In various embodiments, the first control signal conveys an identifier, e.g., a user, device, or connection identifier, to be used as part of a peer to peer network. In various embodiments, the first control signal communicates time and/or frequency information pertaining to peer to peer communications, e.g., information identifying peer to peer communications air link resources that may be used by the wireless communications device and/or a duration of time that the wireless communications device is allowed to operate in the peer to peer network.

In some embodiments, the first control signal conveys peer to peer connection establishment and/or connection maintenance information. In various embodiments, the first control signal conveys peer traffic scheduling information, e.g., information identifying that the wireless communications device has been scheduled by the base station to use a particular peer to peer traffic segment in a peer to peer timing/frequency structure, information identifying that the wireless communications device has been scheduled to transmit peer to peer traffic signals in a particular peer to peer traffic segment, and/or information identifying that the wireless communications device has been scheduled to receive peer to peer traffic signals in a particular peer to peer traffic segment. In various embodiments, the first control signal is one of a plurality of peer to peer control signals transmitted to the wireless communications device.

Operation proceeds from step 204 to step 206. In step 206 the wireless communications device determines whether or not to send a peer to peer communications signal to a second wireless communications device in a second spectrum based on said first control signal, said second spectrum being different from said first spectrum. In some embodiments, the step of determining whether or not to send a peer to peer communications signal to a second wireless communications device in a second spectrum is a peer to peer transmission decision which made by said wireless communications device based on the peer to peer priority information received in the first signal and information received in one or more traffic scheduling signals from other communications devices participating in peer to peer communications. In various embodiments, the wireless communications device participates in a peer to peer style connection scheduling mechanism in which peer to peer transmission decisions, e.g. corresponding to peer to peer traffic segments, are made in a distributed manner by the wireless communications devices participating in the peer to peer communications. Operation proceeds from step 206 to step 208.

In step 208 the wireless communications device proceeds from step 208 to step 210 if the determination of step 206 is to send a peer to peer communications signal to the second wireless communications device in the second spectrum; otherwise, operation proceeds from step 208 to step 214.

Returning to step 210, in step 210 the wireless communications device generates a peer to peer communications signal. Then, in step 212 the wireless communications device transmits said generated peer to peer communications signal to said second wireless communications device in said second spectrum. Operation proceeds from step 212 to step 214.

In step 214 the wireless communications device sends a second control signal to the base station on a third spectrum said third spectrum being different than said first and second spectrums. In some embodiments, the second control signal provides information about communications resource utilization and/or peer to peer communications backlog information to said base station for use in determining an updated peer to peer communications priority. Operation proceeds from step 214 to step 204.

In some embodiments, the first spectrum is a frequency division duplex (FDD) downlink spectrum used by a cellular network, the second spectrum is a time division duplex (TDD) spectrum used for peer to peer communications, and the third spectrum is a frequency division duplex (FDD) uplink spectrum used by the cellular network. In some such embodiments, the first, second and third spectrums do not overlap.

Figure 3:
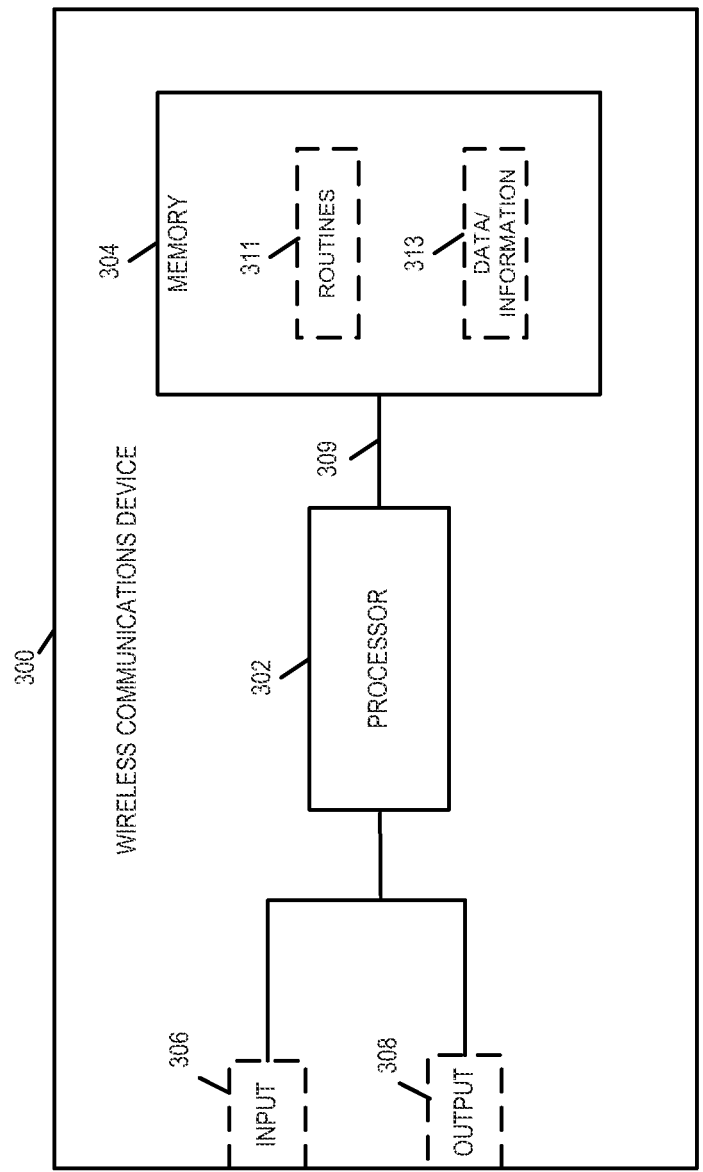
FIG. 3 is a drawing of an exemplary wireless communications device in accordance with an exemplary embodiment.

FIG. 3 is a drawing of an exemplary wireless communications device 300 in accordance with an exemplary embodiment. Exemplary wireless communications device 300 is, e.g., one of the mobile devices of system 100 of FIG. 1.

Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to receive a first control signal from a base station on a first spectrum; determine whether or not to send a peer to peer communications signal to a second wireless device in a second spectrum based on said first control signal, said second spectrum being different from said first spectrum; and send a second control signal to the base station on a third spectrum, said third spectrum being different than first and second spectrums. In some such embodiments, said first spectrum is a FDD downlink spectrum used by a cellular network; said second spectrum is a TDD spectrum used for peer to peer communications; and said third spectrum is an FDD uplink spectrum used by the cellular network. In some such embodiments, said first, second and third spectrums do not overlap.

Figure 4:
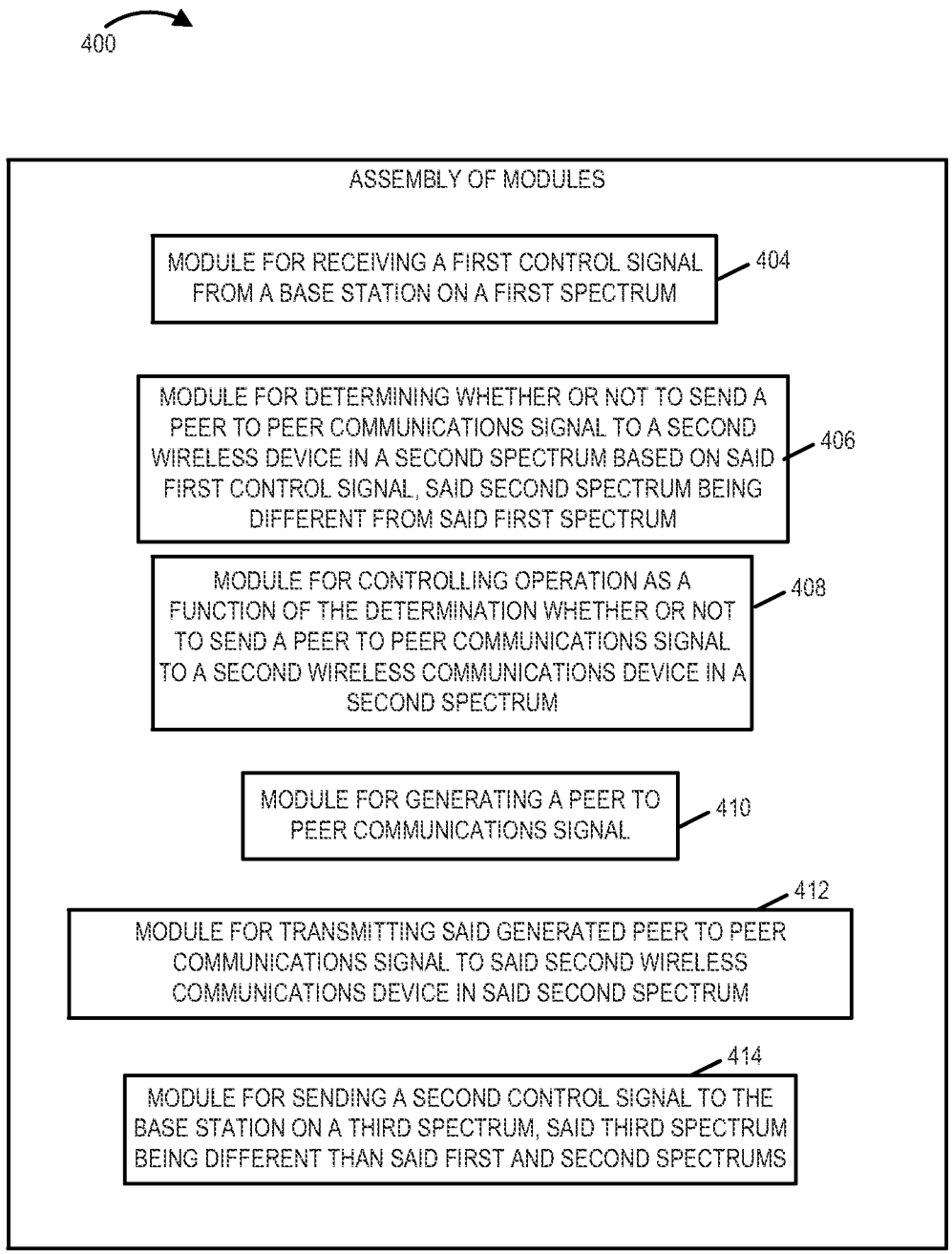
FIG. 4 is an assembly of modules which can, and in some embodiments is, used in the exemplary wireless communications device illustrated in FIG. 3.
Figure 5:
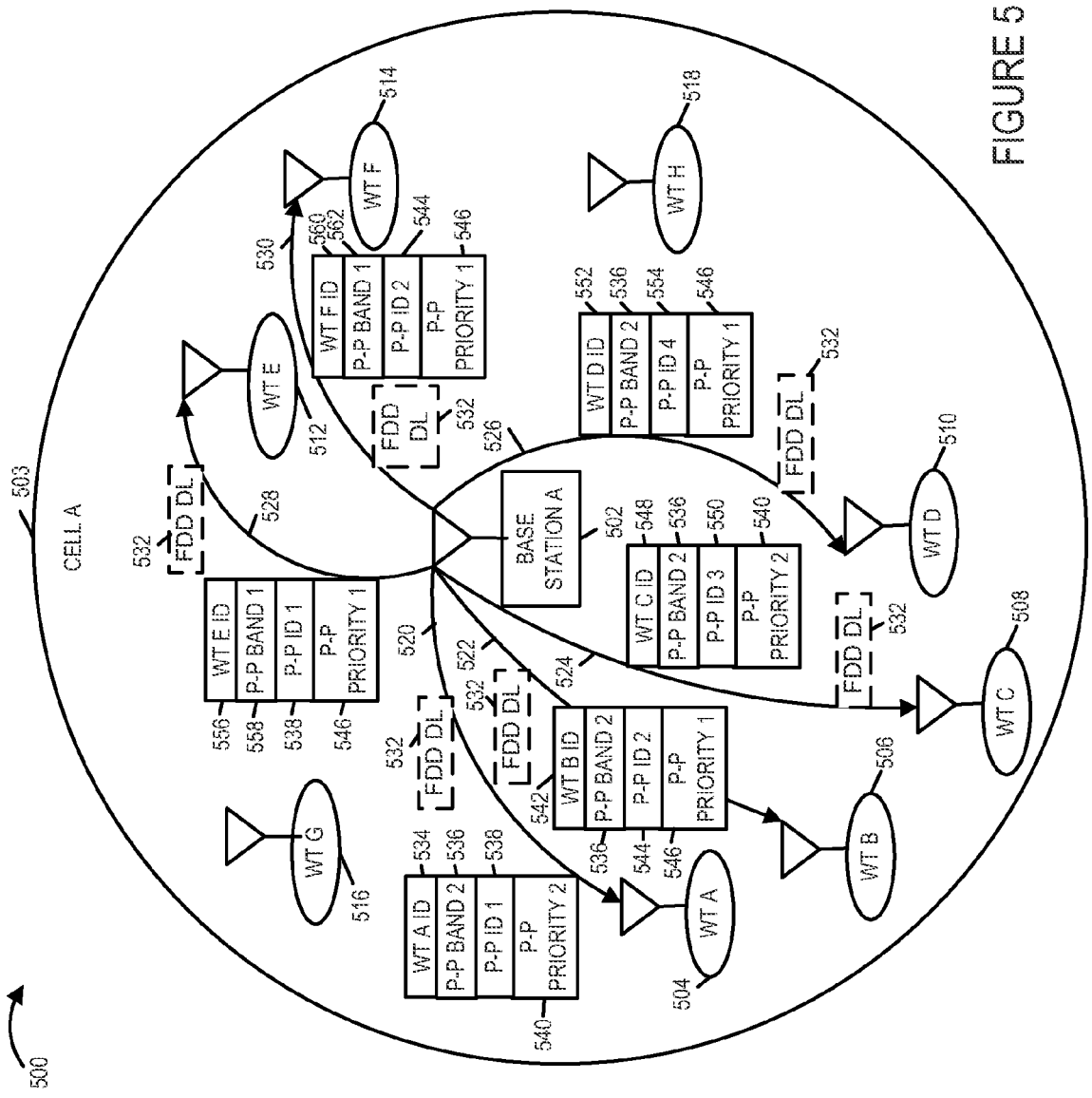
FIG. 5 is a first drawing in a sequence of drawings used to illustrate an example of an exemplary method of operating a wireless communications device in accordance with an exemplary embodiment.

In various embodiments, the base station is part of said cellular network and said first control signal from said base station provides peer to peer communications priority information. In some such embodiments, the second control signal provides information about communications resource utilization and/or peer to peer communications backlog information to said base station for use in determining an updated peer to peer communications priority. In some embodiments, processor 302 is configured to make a peer to peer transmission decision based on the peer to peer priority information received in said first control signal and information received in one or more traffic scheduling signals received from other communications devices participating in peer to peer communications, as part of being configured to determine whether or not to send a peer to peer communications signal to a second wireless device in a second spectrum FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes a module 404 for receiving a first control signal from a base station on a first spectrum, a module 406 for determining whether or not to send a peer to peer communications signal to a second wireless communications device in a second spectrum based on said first control signal, said second spectrum being different from said first spectrum, a module 408 for controlling operation as a function of the determination whether or not to send a peer to peer communications signal to a second wireless communications device in a second spectrum. Assembly of modules 400 further includes a module 410 for generating a peer to peer communications signal, a module 412 for transmitting said generated peer to peer communications signal to said second wireless communications device in said second spectrum and a module 414 for sending a second control signal to the base station on a third spectrum, said third spectrum being different than said first and second spectrums.

In some embodiments, said first spectrum is a FDD downlink spectrum used by a cellular network, said second spectrum is a TDD spectrum used for peer to peer communications; and said third spectrum is an FDD uplink spectrum used by the cellular network. In various embodiments, said first, second and third spectrums do not overlap. In some embodiments, said base station is part of said cellular network and wherein said first control signal from said base station provides peer to peer communications priority information. In various embodiments, second control signal provides information about communications resource utilization and/or peer to peer communications backlog information to said base station for use in determining an updated peer to peer communications priority. In some embodiments, said module 406 for determining whether or not to send a peer to peer communications signal to a second wireless communications device in a second spectrum makes a peer to peer transmission decision based on the peer to peer priority information received in said first control signal and information received in one or more traffic scheduling signals received from other communications devices participating in peer to peer communications.

FIGS. 5-9 illustrate an example of an exemplary method of operating a wireless communications device in accordance with an exemplary embodiment. Drawing 500 of FIG. 5 includes exemplary base station A 502 with corresponding cellular coverage area cell A 503, and exemplary wireless terminals (WT A 504, WT B 506, WT C 508, WT D 510, WT E 512, WT F 514, WT G 516, WT H 518) which support both cellular and peer to peer communications. Exemplary base station A 502 is, e.g., base station 1 102 or base station N 104 of system 100 of FIG. 1. Exemplary wireless terminals (504, 506, 508, 510, 512, 514, 516, 518) are, e.g., any of the exemplary wireless terminals (114, 115, ..., 116, 118, ..., 120) of FIG. 1.

Base station A 502 decides that wireless terminals (WT A 504, WT B 506, WT C 508, WT D 510, WT E 512 and WT F 514) are to communicate using peer to peer communications. In this example, there are a plurality of alternative peer to peer spectrums that may be used in the area of cell A 503. The base station 502 decides which wireless terminals are to use which spectrum, assigns peer to peer identifiers to those wireless terminals, and decides peer to peer priority levels for those wireless terminals. The base station 502 generates and transmits unicast control signals (520, 522, 524, 526, 528, 530) to wireless terminals (WT A 504, WT B 506, WT C 508, WT D 510, WT E 512, WT F 514), respectively, on FDD downlink spectrum 532.

Control signal 520 includes information conveying a WT A identifier 534, information identifying the peer to peer TDD band to use as peer to peer band 2 536, information conveying peer to peer identifier 1 538 as the identifier to be used by WT A, and information identifying that WT A is assigned peer to peer priority level 2 540. Control signal 522 includes information conveying a WT B identifier 542, information identifying the peer to peer TDD band to use as peer to peer band 2 536, information conveying peer to peer identifier 2 544 as the identifier to be used by WT B, and information identifying that WT B is assigned peer to peer priority level 1 546. Control signal 524 includes information conveying a WT C identifier 548, information identifying the peer to peer TDD band to use as peer to peer band 2 536, information conveying peer to peer identifier 3 550 as the identifier to be used by WT C, and information identifying that WT C is assigned peer to peer priority level 2 540. Control signal 526 includes information conveying a WT D identifier 552, information identifying the peer to peer TDD band to use as peer to peer band 2 536, information conveying peer to peer identifier 4 554 as the identifier to be used by WT D, and information identifying that WT D is assigned peer to peer priority level 1 546. Control signal 528 includes information conveying a WT E identifier 556, information identifying the peer to peer TDD band to use as peer to peer band 1 558, information conveying peer to peer identifier 1 538 as the identifier to be used by WT E, and information identifying that WT E is assigned peer to peer priority level 1 546. Control signal 530 includes information conveying a WT F identifier 560, information identifying the peer to peer TDD band to use as peer to peer band 1 562, information conveying peer to peer identifier 2 544 as the identifier to be used by WT F, and information identifying that WT F is assigned peer to peer priority level 1 546.

Figure 6:
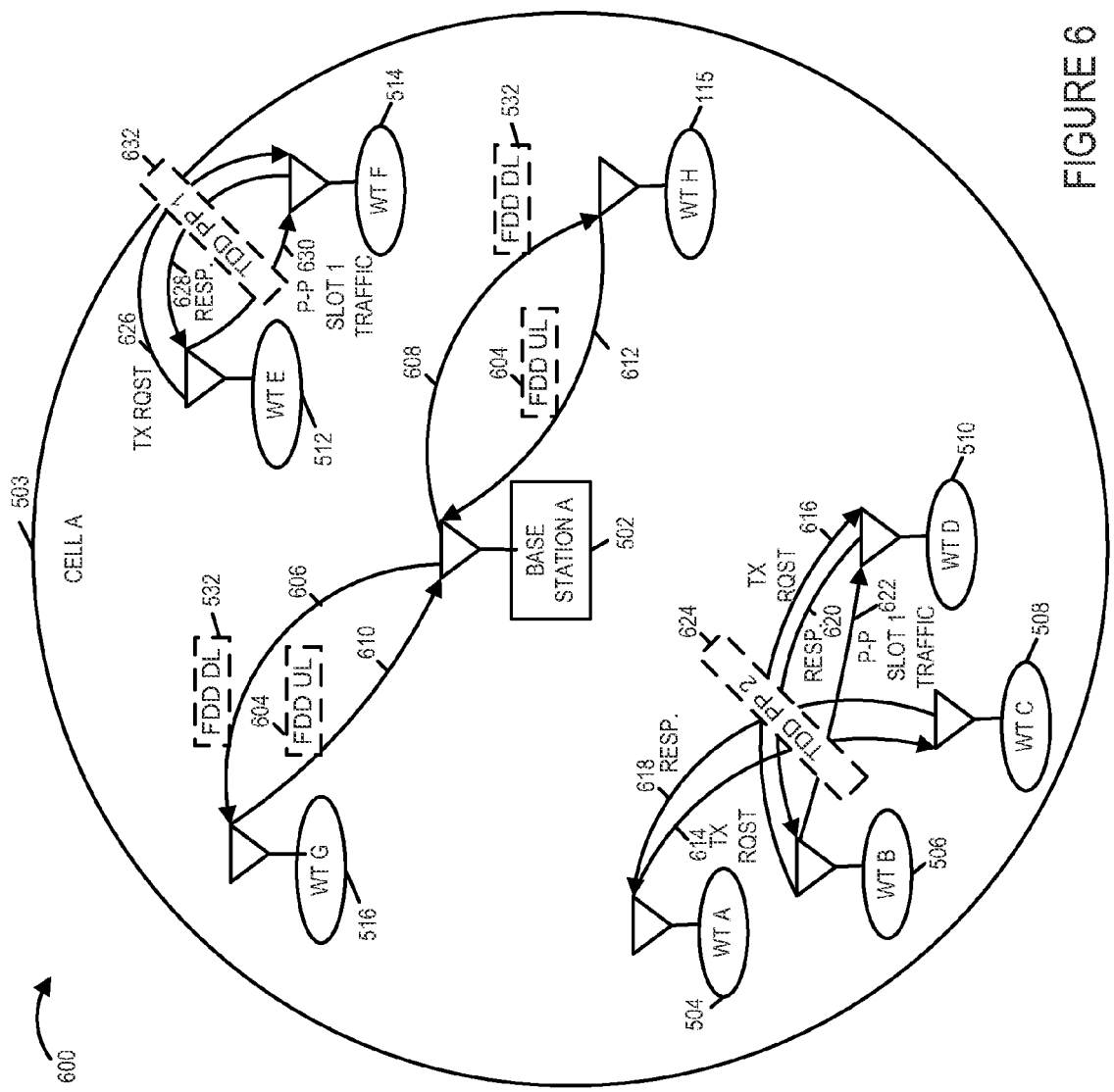
FIG. 6 is a second drawing in a sequence of drawings used to illustrate an example of an exemplary method of operating a wireless communications device in accordance with an exemplary embodiment.

Drawing 600 of FIG. 6 illustrates exemplary cellular communications and peer to peer communications. Base station A 502 is transmitting downlink cellular signals (606, 608) to wireless terminals (WT G 516, WT H 518), respectively, using FDD DL frequency band 532. Wireless terminals (WT G 516, WT H 518) are transmitting uplink cellular signals (610, 612), respectively to base station A 502 using FDD uplink frequency band 604. The cellular signals (606, 608, 610, 612) include cellular control signals and cellular traffic signals.

Wireless terminals (WT A 504, WT B 506, WT C 508, WT D 510) are participating in a localized peer to peer communications network using TDD peer to peer frequency band 2 624. Peer to peer traffic transmission decisions are made in a distributed manner as a function of peer to peer priority level information previously received from base station A 502 and received signals from other devices in the peer to peer network. Wireless terminal A 504 would like to transmit traffic signals to wireless terminal C 508 in traffic slot 1. WT A 504 generates and transmits traffic transmission request signal 614 to WT C 508. Wireless terminal B 506 would like to transmit traffic signals to wireless terminal D 510 in traffic slot 1. WT B 506 generates and transmits traffic transmission request signal 616 to WT D 510. Wireless terminals (WT C 508, WT D 510) approve of the requests and transmit traffic transmission request response signals (618, 620) to wireless terminals (WT A 504, WT B 506), respectively.

Wireless terminals (WT A 504 and WT B 506) monitor and detect the request response signals corresponding to their own requests and corresponding to requests on other links. In this example, WT B 506 detects that WT D has approved its request and that there are no request responses corresponding to higher priority than its own priority level; therefore, WT B 506 decides that it is allowed to transmit traffic signals in peer to peer traffic slot 1. WT A 504 detects that WT C 508 has approved its request; however, WT A 504 detects that WT D 510 has approved a request having a higher priority level than its own priority level. WT A 504 estimates that if it were to transmit peer to peer traffic signals in slot 1 it would generate an unacceptable level of interference to the peer to peer traffic communication between WT B 506 and WT D 510, e.g., above a predetermined yielding threshold. Therefore, WT A 504 determines that it will not transmit peer to peer traffic signals in traffic slot 1. WT B 506 transmits peer to peer traffic signals 622 in peer to peer traffic slot 1.

Wireless terminals (WT E 512, WT F 514) are participating in a localized peer to peer communications network using TDD peer to peer frequency band 1 632. Peer to peer traffic transmission decisions are made in a distributed manner as a function of peer to peer priority level information previously received from base station A 502 and received signals from other devices in the peer to peer network. Wireless terminal E 512 would like to transmit traffic signals to wireless terminal F 514 in traffic slot 1. WT E 512 generates and transmits traffic transmission request signal 626 to WT F 514. WT F 514 approves of the request and transmits traffic transmission request response signals 628 to wireless terminal F 514

Wireless terminal E 512 monitors and detect for a request response signal corresponding to its own requests and corresponding to requests on other links. In this example, WT E 512 detects that WT F 514 has approved of its request and that there are no request responses corresponding to higher priority than its own priority level; therefore, WT E 512 decides that it is allowed to transmit traffic signals in peer to peer traffic slot 1. WT E 506 transmits peer to peer traffic signals 630 in peer to peer traffic slot 1.

In the example of FIGS. 5-9, FDD downlink frequency band 532, FDD uplink frequency band 604, TDD peer to peer frequency band 1 632 and TDD peer to peer frequency band 2 624 are non-overlapping.

Figure 7:
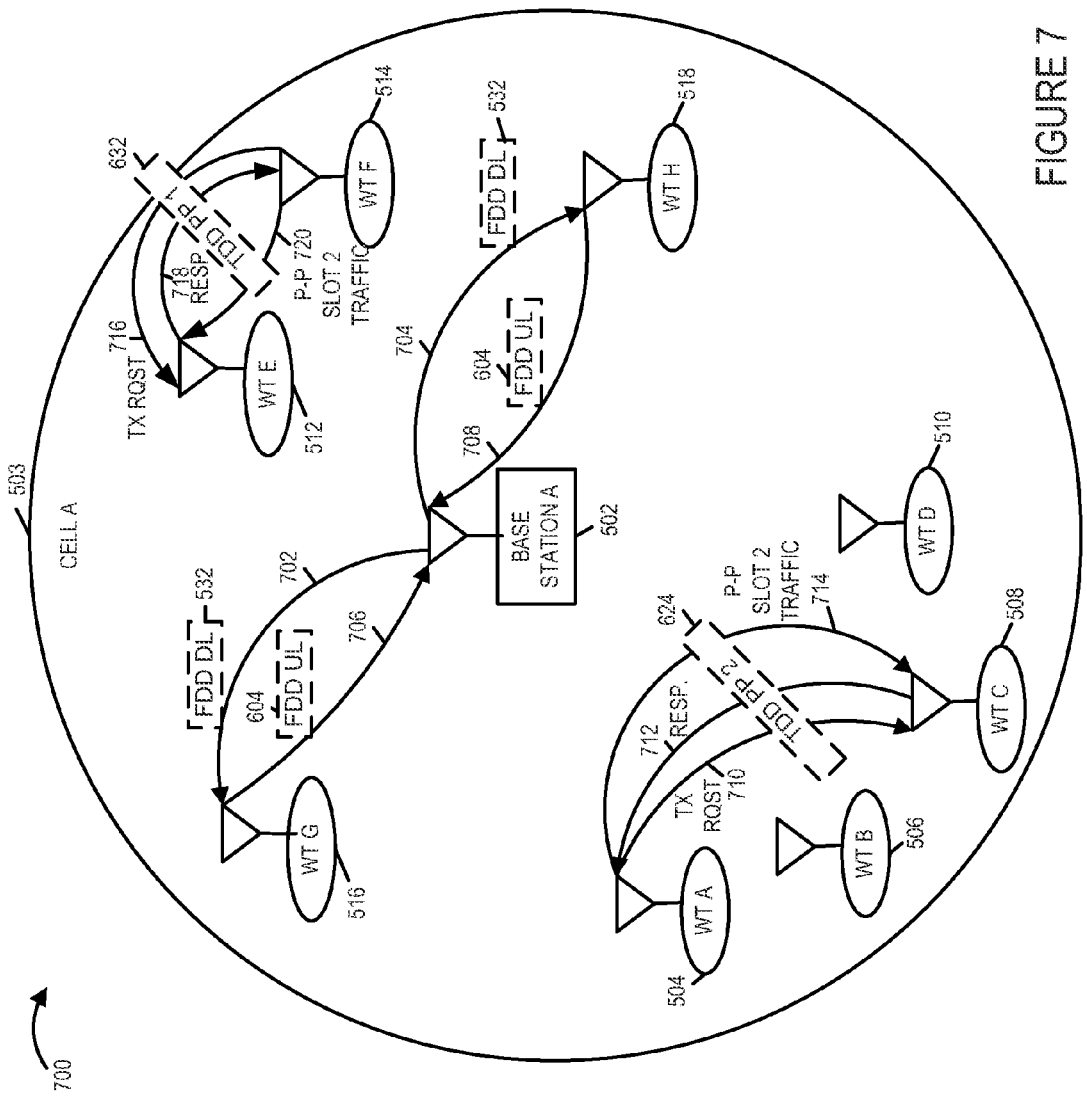
FIG. 7 is a third drawing in a sequence of drawings used to illustrate an example of an exemplary method of operating a wireless communications device in accordance with an exemplary embodiment.

Drawing 700 of FIG. 7 illustrates additional exemplary cellular communications and additional peer to peer communications corresponding to a subsequent peer to peer traffic transmission slot. Base station A 502 is transmitting downlink cellular signals (702, 704) to wireless terminals (WT G 516, WT H 518), respectively, using FDD DL frequency band 532. Wireless terminals (WT G 516, WT H 518) are transmitting uplink cellular signals (706, 708), respectively to base station A 502 using FDD uplink frequency band 604. The cellular signals (702, 704, 706, 708) include cellular control signals and cellular traffic signals.

Wireless terminals (WT A 504, WT B 506, WT C 508, WT D 510) are still participating in a localized peer to peer communications network using TDD peer to peer frequency band 2 624. Peer to peer traffic transmission decisions are made in a distributed manner as a function of peer to peer priority level information previously received from base station A 502 and received signals from other devices in the peer to peer network. Wireless terminal A 504 would like to transmit traffic signals to wireless terminal C 508 in traffic slot 2. WT A 504 generates and transmits traffic transmission request signal 710 to WT C 508. WT C 508 approves of the requests and transmit traffic transmission request response signals 712 to WT A 504.

WT A 504 monitors for request response signals corresponding to their own requests and corresponding to requests on other links. In this example, WT A 504 detects that WT C 508 has approved of its request and that there are no request responses corresponding to higher priority than its own priority level; therefore, WT A 504 decides that it is allowed to transmit traffic signals in peer to peer traffic slot 2. WT A 504 transmits peer to peer traffic signals 714 in peer to peer traffic slot 2, which are received and recovered by WT C 508.

Wireless terminals (WT E 512, WT F 514) are still participating in a localized peer to peer communications network using TDD peer to peer frequency band 1 632. Peer to peer traffic transmission decisions are made in a distributed manner as a function of peer to peer priority level information previously received from base station A 502 and received signals from other devices in the peer to peer network. Wireless terminal F 514 would like to transmit traffic signals to wireless terminal E 512 in traffic slot 2. WT F 514 generates and transmits traffic transmission request signal 716 to WT E 512. WT E 512 approves of the request and transmit traffic transmission request response signals 718 to wireless terminal E 512.

Wireless terminal F 514 monitors and detect for a request response signal corresponding to its own requests and corresponding to requests on other links. In this example, WT F 514 detects that WT E 512 has approved of its request and that there are no request responses corresponding to higher priority than its own priority level; therefore, WT F 514 decides that it is allowed to transmit traffic signals in peer to peer traffic slot 2. WT F 512 transmits peer to peer traffic signals 720 in peer to peer traffic slot 2 which are received and recovered by WT E 512.

Figure 8:
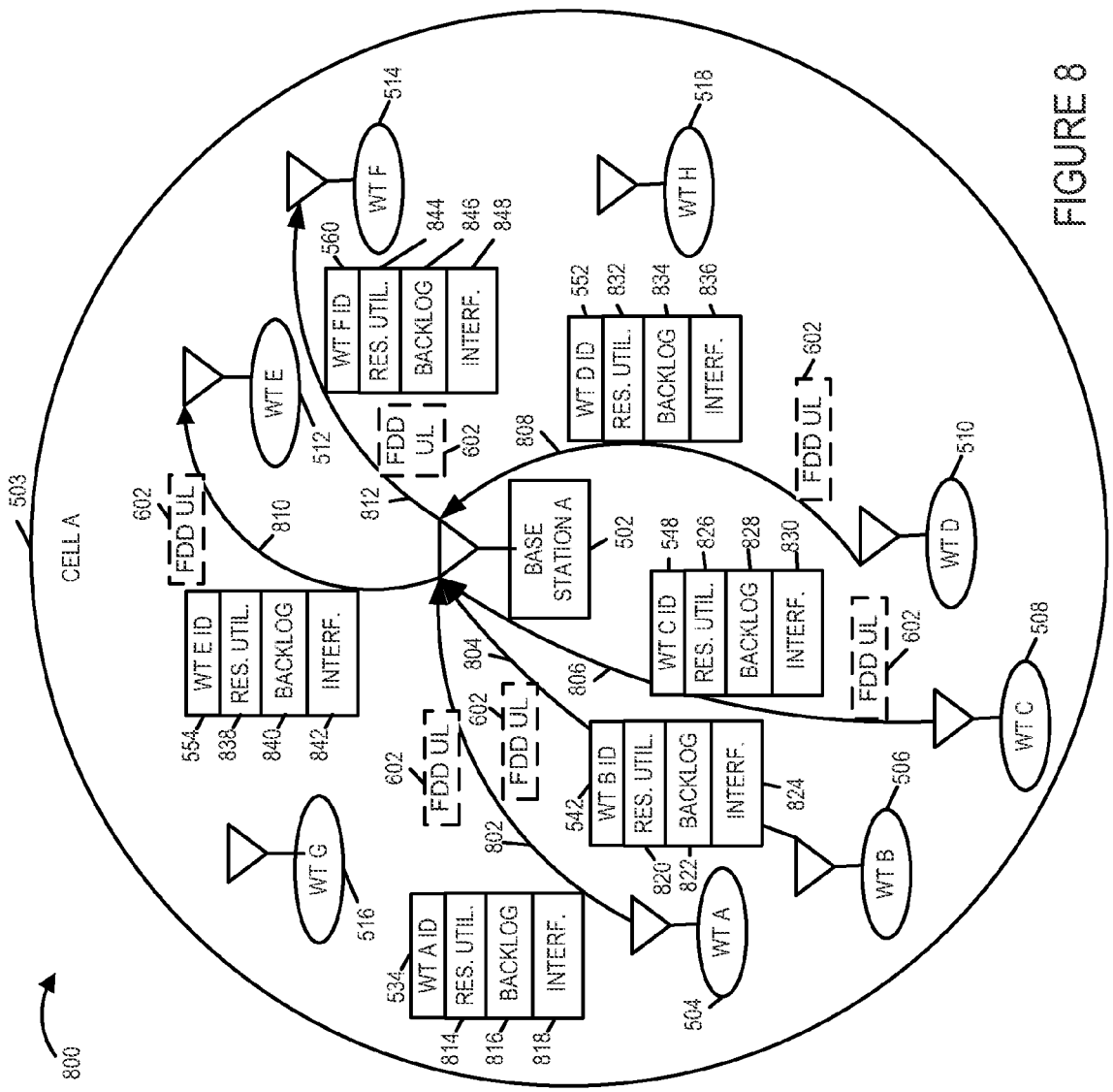
FIG. 8 is a fourth drawing in a sequence of drawings used to illustrate an example of an exemplary method of operating a wireless communications device in accordance with an exemplary embodiment.

FIG. 8 is a drawing 800 illustrating exemplary control signals (802, 804, 806, 808, 810, 812) conveying peer to peer feedback information from wireless terminals (504, 506, 508, 510, 512, 514), respectively, to the base station A 502 using the FDD uplink frequency band 602. Wireless terminals (WT A 504, WT B 506, WT C 508, WT D 510, WT E 512, WT F 514) generate and transmit control signals (802, 804, 806, 808, 810, 812), respectively, to base station A 502 which receives and recovers communicated information.

Control signal 802 includes information conveying WT A identifier 534, communications resource utilization information 814, peer to peer communications backlog information 816 and interference information 818. Control signal 804 includes information conveying WT B identifier 542, communications resource utilization information 820, peer to peer communications backlog information 822 and interference information 824. Control signal 806 includes information conveying WT C identifier 548, communications resource utilization information 826, peer to peer communications backlog information 828 and interference information 830. Control signal 808 includes information conveying WT D identifier 552, communications resource utilization information 832, peer to peer communications backlog information 834 and interference information 836. Control signal 810 includes information conveying WT E identifier 554, communications resource utilization information 838, peer to peer communications backlog information 840 and interference information 842. Control signal 812 includes information conveying WT F identifier 560, communications resource utilization information 844, peer to peer communications backlog information 846 and interference information 848.

Base station A 502 uses the information communicated in the control signals (802, 804, 806, 808, 810, 812) in its decisions as to which wireless terminals should use peer to peer communications, which peer to peer communications bands to use, and to set the priority levels for peer to peer communications, e.g., updating peer to peer communications priority. In addition to the received peer to peer feedback information the base station uses information corresponding to the cellular network, e.g., cellular loading information and/or cellular interference measurement information in making decisions regarding the peer to peer networks.

Figure 9:
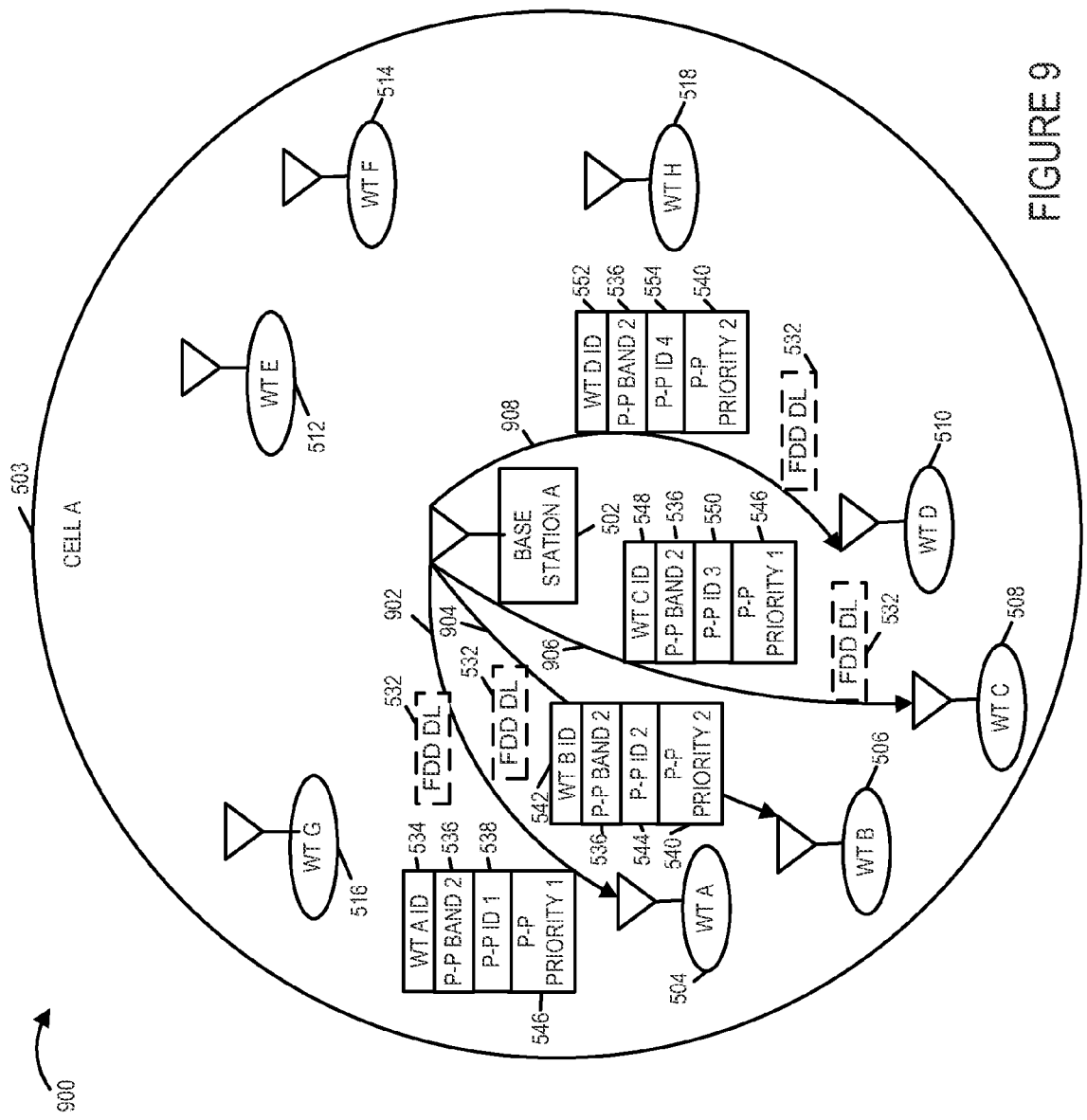
FIG. 9 is a fifth drawing in a sequence of drawings used to illustrate an example of an exemplary method of operating a wireless communications device in accordance with an exemplary embodiment.

Drawing 900 of FIG. 9 illustrates that base station A 502 has decided that wireless terminals (WT A 504, WT B 506, WT C 508, WT D 510) are to continue communicating using peer to peer communications. Wireless terminals (WT E 512, WT F 514, WT G 516 and WT H 514) are to communicate using the cellular network. The base station 502 generates and transmits unicast control signals (902, 904, 906, 908) to wireless terminals (WT A 504, WT B 506, WT C 508, WT D 510), respectively, on FDD downlink spectrum 532.

Control signal 902 includes information conveying WT A identifier 534, information identifying the peer to peer TDD band to use as peer to peer band 2 536, information conveying peer to peer identifier 1 538 as the identifier to be used by WT A, and information identifying that WT A is assigned peer to peer priority level 1 546. Control signal 904 includes information conveying WT B identifier 542, information identifying the peer to peer TDD band to use as peer to peer band 2 536, information conveying peer to peer identifier 2 544 as the identifier to be used by WT B, and information identifying that WT B is assigned peer to peer priority level 2 540. Control signal 906 includes information conveying WT C identifier 548, information identifying the peer to peer TDD band to use as peer to peer band 2 536, information conveying peer to peer identifier 3 550 as the identifier to be used by WT C, and information identifying that WT C is assigned peer to peer priority level 1 546. Control signal 908 includes information conveying WT D identifier 552, information identifying the peer to peer TDD band to use as peer to peer band 2 536, information conveying peer to peer identifier 4 554 as the identifier to be used by WT D, and information identifying that WT D is assigned peer to peer priority level 2 540.

Figure 10B:
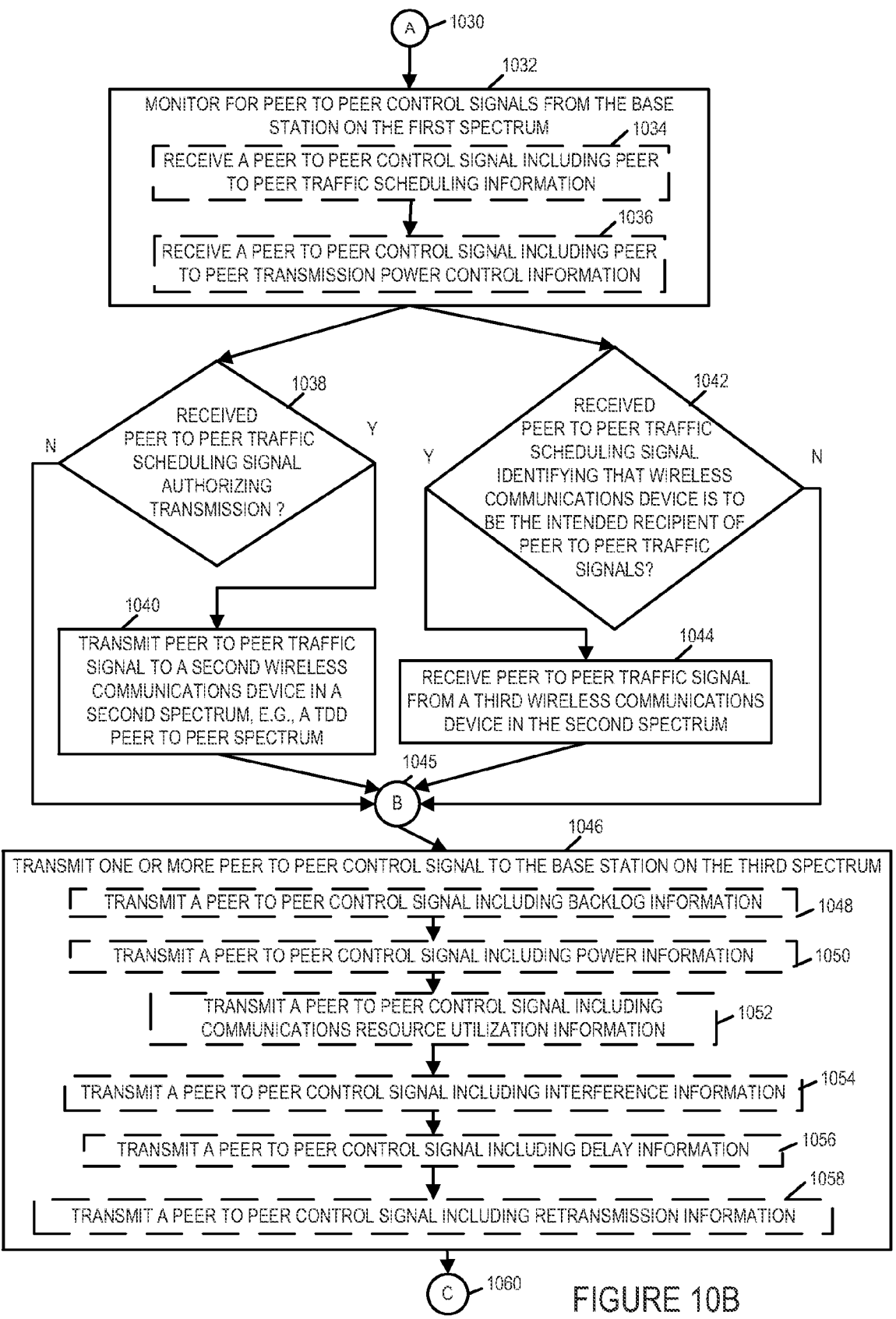
FIG. 10B is a second part of a flowchart of an exemplary method of operating a wireless communications device in accordance with an exemplary embodiment.

FIG. 10, comprising the combination of FIG. 10A and FIG. 10B, is a flowchart 1000 of an exemplary method of operating a wireless communications device in accordance with an exemplary embodiment. The wireless communications device implementing the method of flowchart 1000 of FIG. 10 is, e.g., one of the wireless terminals (114, 115, . . . , 116, 118, . . . , 120) of system 100 of FIG. 1.

Operation of the exemplary method starts in step 1002, where the wireless communications device is powered on and initialized. Operation proceeds from start step 1002 to step 1004. In step 1004 the wireless communications device monitors for peer to peer control signals from a base station on a first spectrum, e.g., a FDD cellular downlink spectrum. Step 1104 may, and sometimes does, include one or more of steps 1006, 1008 and 1010. In step 1006 the wireless communications device receives a peer to peer control signal including peer to peer band identification information. In some embodiments, the peer to peer identification information identifies one of a plurality of alternative peer to peer communications band, and the identified band is to be used by the wireless communications device for peer to peer communications. In step 1008 the wireless communications device receives a peer control signal including peer to peer access information. In some embodiments, the peer to peer access information is a peer to peer identifier to be used by the wireless communications device in a peer to peer network. In step 1010 the wireless communications device receives a peer to peer control signal including peer to peer priority information, e.g., information identifying one of a plurality of alternative priority levels for peer to peer communications. In some embodiments different priority levels correspond to different levels of resource allocation, e.g., different amounts of peer to peer traffic which can be transmitted in a given time, different numbers of concurrent peer to peer communications links which can be simultaneously maintained, different transmission power levels which may be used, etc. In some embodiments, one or more of the control signals received by the monitoring of step 1004 indicates to the wireless communications device that it is commanded to use peer to peer communications, e.g., as opposed to used cellular communications. In some embodiments, one or more of the control signals received by the monitoring of step 1004 indicates to the wireless communications device that it is permitted to use peer to peer communications.

In step 1012, the wireless communications device determines whether or not it is authorized for peer to peer communications. If the wireless communications device determines that it is not authorized for peer to peer communication, then operation proceeds from step 1012 to step 1004. However, if the wireless communications device determines that it is authorized for peer to peer communications, then operation proceeds from step 1012 to step 1014.

In step 1014 the wireless communications device transmits a peer to peer control signal to the base station on a third spectrum, e.g., a FDD cellular uplink spectrum. In some embodiments, step 1014 may, and sometimes does, include step 1016. In step 1016 the wireless communications device transmits a peer to peer control signal including a peer to peer connection establishment request. Operation proceeds from step 1014 to step 1018.

In step 1018 the wireless communications device monitors for a peer to peer control signal from the base station on the first spectrum. Step 1018 may, and sometimes does, include step 1020, in which the wireless communications device receives a peer to peer control signal including peer to peer connection establishment information and/or peer to peer connection maintenance information. In some embodiments, the connection establishment information includes a peer to peer connection identifier and/or information identifying air link resources associated with the peer to peer connection. Operation proceeds from step 1018 to step 1022.

In step 1022 the wireless communications device determines whether or not a peer to peer connection is established in which the wireless communications device is one of devices corresponding to the connection. If a peer to peer connection is not established, then operation proceeds from step 1022 to step 1018. However, if a peer to peer connection is established then operation proceeds from step 1022 to step 1024.

In step 1024 the wireless communications devices determines whether or not it has peer to peer traffic to transmit. If the wireless communications device determines that it does not have peer to peer traffic to communicate, then operation proceeds from step 1024 to connecting node A 1030. However, if the wireless communications device determines that it has peer to peer traffic waiting to be transmitted, e.g., in its peer to peer traffic queue, then operation proceeds from step 1024 to step 1026.

In step 1026 the wireless communications device transmits a peer to peer control signal to the base station on the third spectrum. Step 1026 may, and sometimes does, include step 1028, in which the wireless communications device transmits a peer to peer control signal including a peer to peer traffic transmission request to the base station. Operation proceeds from step 1026 to connecting node A 1030. Operation proceeds from connecting node A 1030 to step 1032.

In step 1032 the wireless communications device monitors for peer to peer control signals to the base station on the first spectrum. Step 1032 may, and sometimes does, include one or more of steps 1034 and 1036. In step 1034 the wireless communications device receives a peer to peer control signal including peer to peer scheduling information, e.g., assignments corresponding to peer to peer traffic segments in a recurring peer to peer timing structure, and in step 1036 the wireless communications device receives a peer to peer control signal including peer to peer transmission power information, e.g., information identifying a maximum transmission power level to be used for peer to peer traffic signals for an assigned peer to peer traffic segment.

Operation proceeds from step 1032 to steps 1038 and 1042. In step 1038 the wireless communications devices determines whether or not it has received a peer to peer traffic scheduling signal authorizing transmission, e.g., whether or not it has been assigned a peer to peer traffic segment to use corresponding to its request of step 1028. If the wireless communications device determines that it has not received a peer to peer traffic scheduling signal authorizing transmission, then operation proceeds from step 1038 to connecting node B 1045; otherwise operation proceeds from step 1038 to step 1040. In step 1040 the wireless communications device transmits a peer to peer traffic signal to a second wireless communications device in a second spectrum, e.g., a TDD peer to peer spectrum, e.g., the TDD spectrum identified by the information received in step 1006. Operation proceeds from step 1040 to connecting node B 1045.

Returning to step 1042, in step 1042 the wireless communications device determines whether or not it has received a scheduling signal identifying that the wireless communications device is to be the intended recipient of peer to peer traffic signals. If the wireless communications device determines that it is not to be a recipient of peer to peer traffic signals then operation proceeds from step 1042 to connecting node B 1045. However, if the wireless communications device determines that it intended to be a recipient of peer to peer traffic signals, then operation proceeds from step 1042 to step 1044. In step 1044 the wireless communications device receives peer to peer traffic signal from a third wireless communications device in the second spectrum. Operation proceeds from step 1044 to connecting node B 1045.

Operation proceeds from connecting node B 1045 to step 1046. In step 1046 the wireless communications device transmits one or more peer to peer control signal to the base station on the third spectrum. Step 1046 may, and sometimes does, include one or more of steps 1048, 1050, 1052, 1054, 1056 and 1058. In step 1048 the wireless communications device transmits a peer to peer control signal including backlog information, e.g., information pertaining to peer to peer traffic waiting in one or more transmission queues in the wireless communications device, e.g., frame count information. In step 1050 the wireless communications device transmits a control signal including power information, e.g. information identifying the remaining battery power in the wireless communications device, information indicated the transmission power level being used by the wireless communications device for peer to peer communications, information indicated a desired peer to peer transmission power level for the wireless communications device and/or information indicated received power levels corresponding to other wireless devices as detected by the wireless communications device. In step 1052 the wireless communications device transmits a peer to peer control signal including communications resource utilization information, e.g., information indicating an amount of peer to peer traffic the wireless communications has successfully transmitted. In step 1054 the wireless communications device transmits a peer to peer control signal including interference information, e.g., information indicating the level of interference being experienced in reception by the wireless communications device and/or information indicating the level of interference that the wireless communications device estimates that it is causing to other peer to peer connections by its peer to peer transmissions. In step 1056 the wireless communications device transmits a peer to peer control signal including delay information, e.g., information identifying latency requirements of peer to peer traffic waiting to be transmitted, information identifying whether or not it has any latency sensitive data waiting to be transmitted, and historical latency information regarding peer to peer traffic transmission. In step 1058 the wireless communications device transmits a peer to peer control signal including retransmission information, e.g., information identifying failed peer to peer traffic signals which were not successfully recovered, and information identifying peer to peer transmission success/failure statistical information. Operation proceeds from step 1046 via connecting node C 1060 to step 1004.

In various embodiments, the first, second and third spectrums are non-overlapping. In some embodiments, the first and third spectrums are used for cellular WAN signaling including cellular WAN control signaling and cellular WAN traffic signaling and peer to peer control signaling. In some embodiments, the second spectrum is used for peer to peer signaling including peer to peer traffic signaling.

In some embodiments a peer to peer control signal received from the base station on the first spectrum in step 1004 includes one or more or all of: peer to peer band identification information, peer to peer access information, peer to peer priority information, a command to use peer to peer signaling, a suggestion to use peer to peer signaling, and authorization to use peer to peer signaling. In various embodiments, a peer to peer control signal received from the base station on the first spectrum in step 1032 includes one or more or all of: (i) peer to peer traffic scheduling information, (ii) peer to peer transmission power control information, and (iii) peer to peer transmission rate information. In some embodiments, a peer to peer control signal transmitted to the base station on the third spectrum in step 1046 includes one or more or all of: (i) backlog information, (ii) power information, (iii) resource utilization information, (iv) interference information, (v) delay information and (vi) retransmission information.

In some embodiments, at least some of the peer to peer control signals transmitted from the base station to the wireless communications device in the first spectrum are unicast signals.

Figure 11:
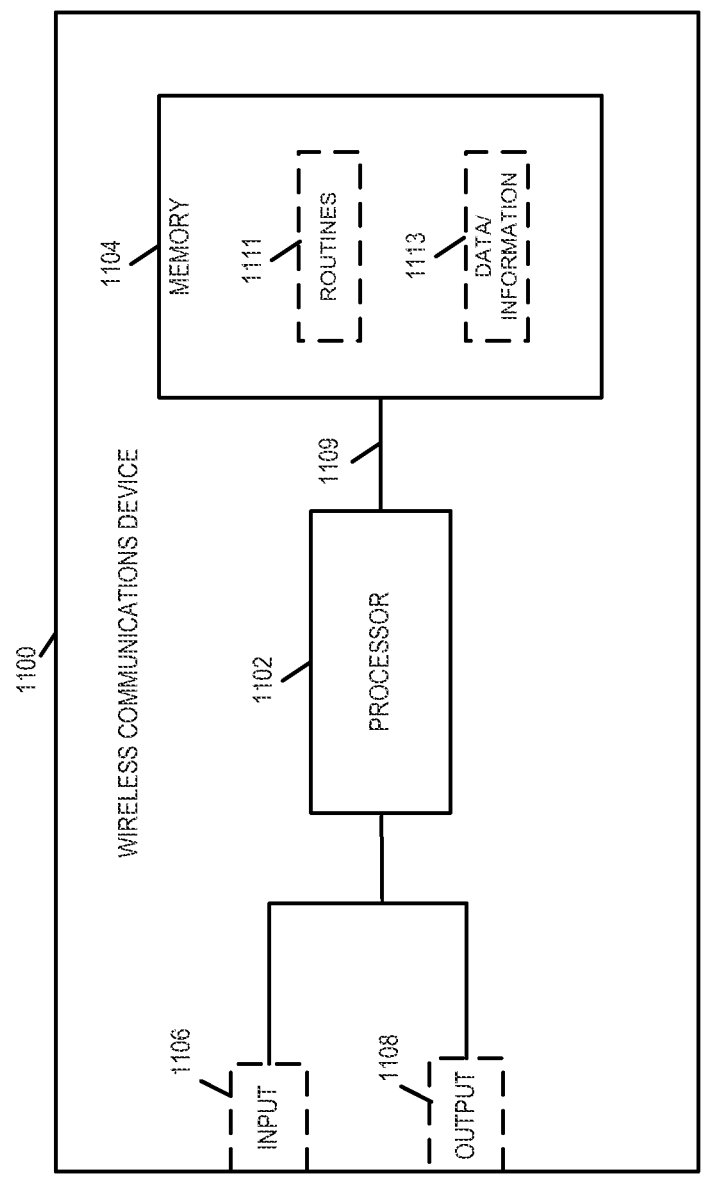
FIG. 11 is a drawing of an exemplary wireless communications device in accordance with an exemplary embodiment.

FIG. 11 is a drawing of an exemplary wireless communications device 1100 in accordance with an exemplary embodiment. Exemplary wireless communications device 1100 is, e.g., one of the mobile devices (114, 115, ..., 166, 118, ..., 120) of system 100 of FIG. 1. Exemplary wireless communications device 1100 may, and sometimes does, implement a method in accordance with flowchart 1000 of FIG. 10.

Wireless communications device 1100 includes a processor 1102 and memory 1104 coupled together via a bus 1109 over which the various elements (1102, 1104) may interchange data and information. Wireless communications device 1100 further includes an input module 1106 and an output module 1108 which may be coupled to processor 1102 as shown. However, in some embodiments, the input module 1106 and output module 1108 are located internal to the processor 1102. Input module 1106 can receive input signals. Input module 1106 can, and in some embodiments does, include a wireless receiver and/or a wired or optical input interface for receiving input. Output module 1108 may include, and in some embodiments does include, a wireless transmitter and/or a wired or optical output interface for transmitting output. In some embodiments, memory 1104 includes routines 1111 and data/information 1113.

Figures 12, 12A:
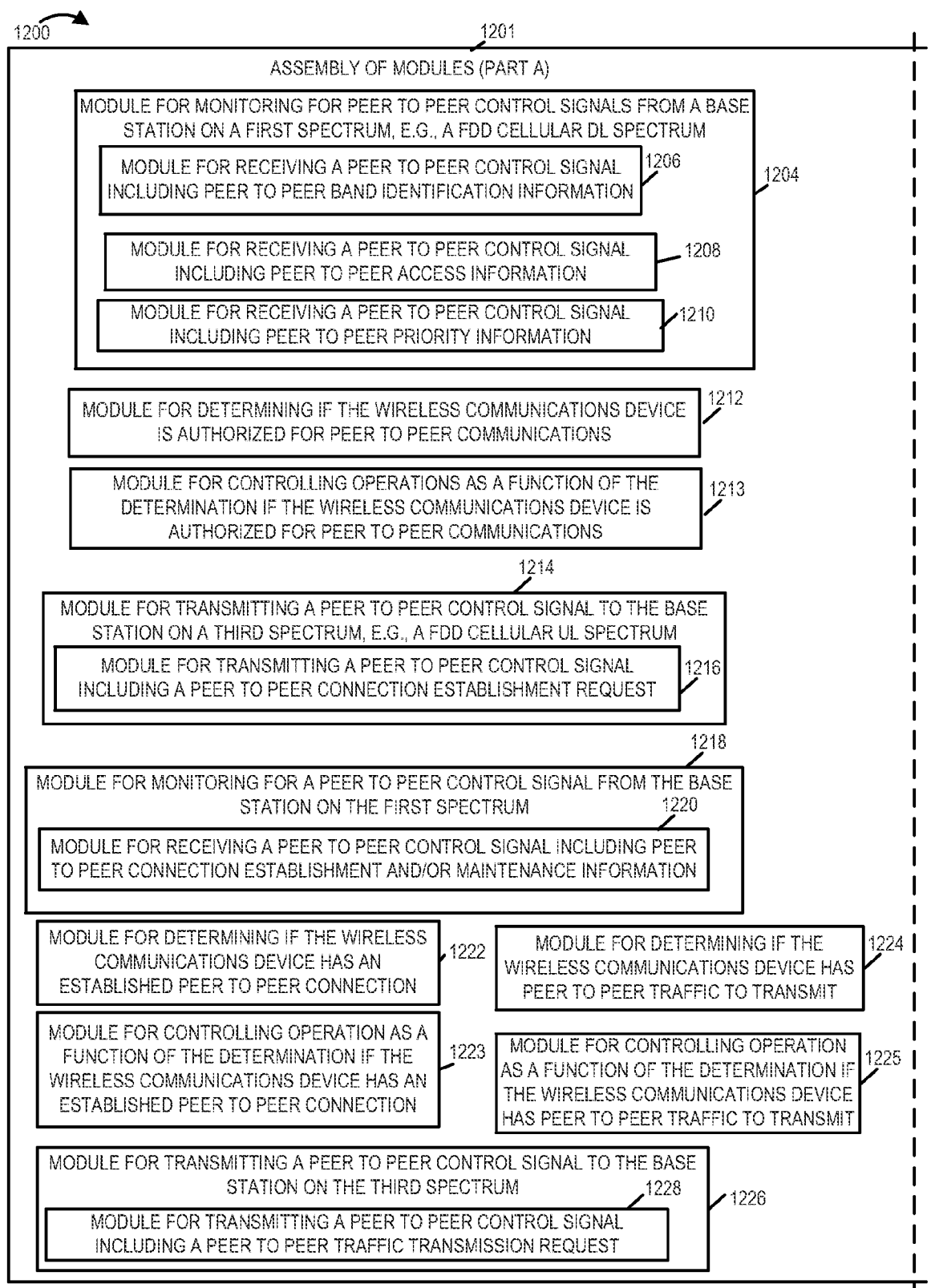
FIG. 12A is a first portion of an assembly of modules which can, and in some embodiments is, used in the exemplary wireless communications device illustrated in FIG. 11.

FIG. 12 is an assembly of modules 1200 which can, and in some embodiments is, used in the exemplary wireless communications device 1100 illustrated in FIG. 11. The modules in the assembly 1100 can be implemented in hardware within the processor 1102 of FIG. 11, e.g., as individual circuits. Alternatively, the modules may be implemented in software and stored in the memory 1104 of wireless communications device 1100 shown in FIG. 11. In some such embodiments, the assembly of modules 1200 is included in routines 1111 of memory 1104 of device 1100 of FIG. 11. While shown in the FIG. 11 embodiment as a single processor, e.g., computer, it should be appreciated that the processor 1102 may be implemented as one or more processors, e.g., computers. When implemented in software the modules include code, which when executed by the processor, configure the processor, e.g., computer, 1102 to implement the function corresponding to the module. In some embodiments, processor 1102 is configured to implement each of the modules of the assembly of modules 1200. In embodiments where the assembly of modules 1200 is stored in the memory 1104, the memory 1104 is a computer program product comprising a computer readable medium, e.g., a non-transitory computer readable medium, comprising code, e.g., individual code for each module, for causing at least one computer, e.g., processor 1102, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 1100 or elements therein such as the processor 1102, to perform the functions of the corresponding steps illustrated and/or described in the method of flowchart 1000 of FIG. 10.

Figure 12B:
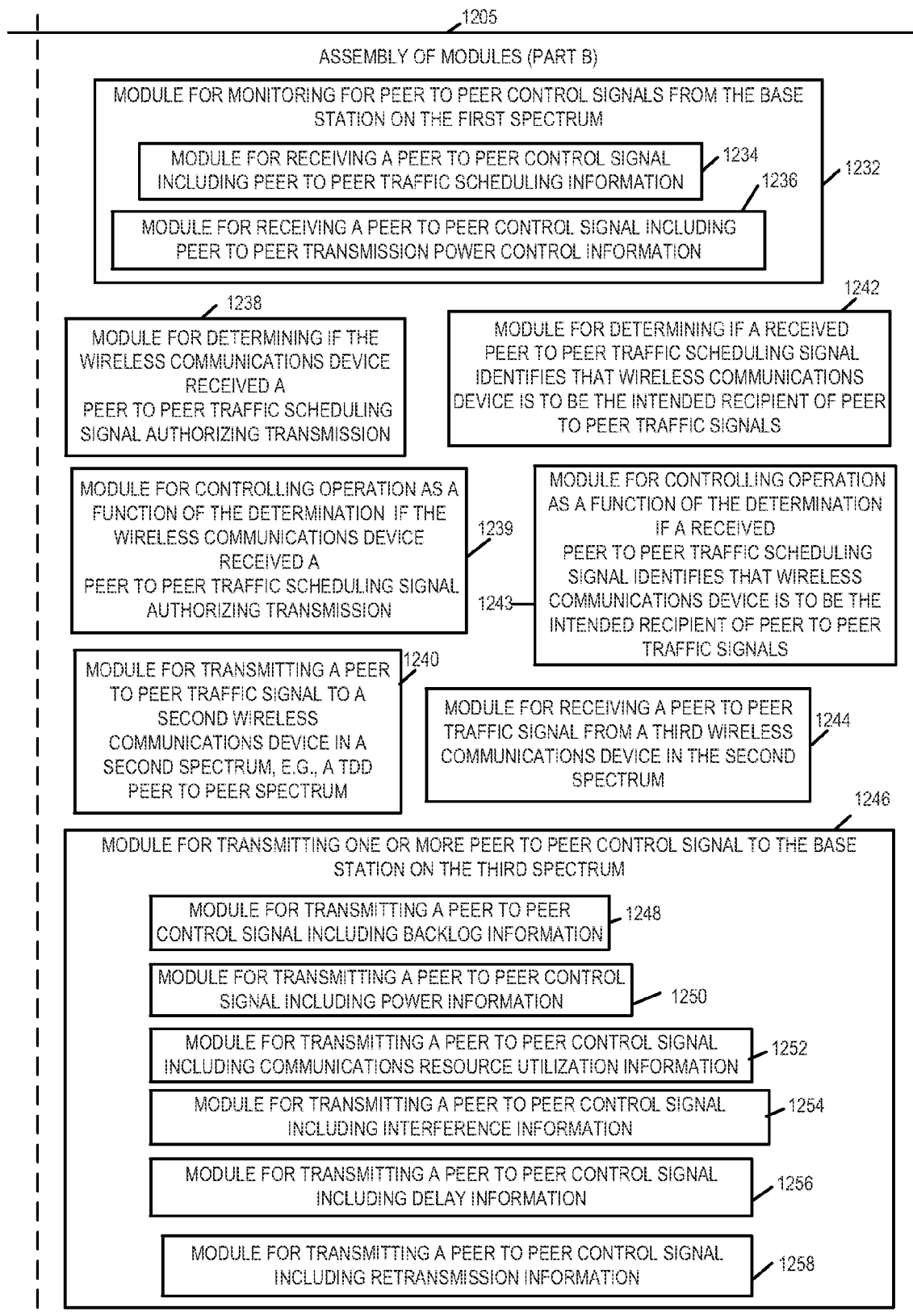
FIG. 12B is a second portion of an assembly of modules which can, and in some embodiments is, used in the exemplary wireless communications device illustrated in FIG. 11.

Assembly of modules 1200, comprising the combination of part A 1201 of FIG. 12A and part B 1205 of FIG. 12B includes a module 1204 for monitoring for peer to peer control signals from a base station on a first spectrum, e.g., a FDD cellular DL spectrum, a module 1212 for determining if the wireless communications device is authorized for peer to peer communications, a module 1213 for controlling operations as a function of the determination as to whether or not the wireless communications device is authorized for peer to peer communications, a module 1214 for transmitting a peer to peer control signal to the base station on a third spectrum, e.g., a FDD cellular UL spectrum, a module 1218 for monitoring for a peer to peer control signal from the base station on the first spectrum, a module 1222 for determining if the wireless communications device has an established peer to peer connection, a module 1223 for controlling operations as a function of the determination as to whether or not the wireless communications device has an established peer to peer connection, a module 1224 for determining if the wireless communications device has peer to peer traffic to transmit, a module 1225 for controlling operation as a function of the determination as to whether or not the wireless communications device has peer to peer traffic to transmit, and a module 1226 for transmitting a peer to peer control signal to the base station on the third spectrum. Module 1204 includes a module 1206 for receiving a peer to peer control signal including peer to peer band identification information, a module 1208 for receiving a peer to peer control signal including peer to peer access information and a module 1210 for receiving a peer to peer control signal including peer to peer priority information. Module 1214 includes a module 1216 for transmitting a peer to peer control signal including a peer to peers connection establishment request. Module 1226 includes a module 1228 for transmitting a peer to peer control signal including a peer to peer traffic transmission request.

Assembly of modules 1200 further includes a module 1232 for monitoring for peer to peer control signals from the base station on the first spectrum, a module 1238 for determining if the wireless communications device received a peer to peer traffic scheduling signal authorizing the wireless communications device to transmit of peer to peer traffic signals, a module 1239 for controlling operations as a function of the determination as to whether or not the wireless communications device received a peer to peer traffic scheduling signal authorizing transmission, a module 1242 for determining if a received peer to peer traffic scheduling signal identifies that the wireless communications device is to be the intended recipient of the peer to peer traffic signals, a module 1243 for controlling operations as a function of the determination as to whether or not the wireless communications device received a peer to peer traffic scheduling signals identifying that the communications device is to be the intended recipient of peer to peer traffic signals, a module 1240 for transmitting a peer to peer traffic signal to a second wireless communications device in a second spectrum, e.g., a TDD peer o peer spectrum, a module 1244 for receiving a peer to peer traffic signal from a third wireless communications device in the second spectrum, and a module 1246 for transmitting one or more peer to peer control signals to the base station on the third spectrum. Module 1232 includes a module 1234 for receiving a peer to peer control signal including peer to peer traffic scheduling information and a module 1236 for receiving a peer to per control signal including peer to peer transmission power control information. Module 1246 includes a module 1248 for transmitting a peer to peer control signal including backlog information, a module 1250 for transmitting a peer to peer control signal including power information, a module 1252 for transmitting a peer to peer control signal including communications resource utilization information, a module 1254 for transmitting a peer to peer control signal including interference information, a module 1256 for transmitting a peer to peer control signal including delay information, and a module 1258 for transmitting a peer to peer control signal including retransmission information.

In some embodiments, said first spectrum is a FDD downlink spectrum used by a cellular network, said second spectrum is a TDD spectrum used for peer to peer communications; and said third spectrum is an FDD uplink spectrum used by the cellular network. In various embodiments, said first, second and third spectrums do not overlap. In various embodiments, at least some of the peer to peer control signals transmitted to the wireless communications device in the first spectrum are unicast signals.

Figure 13:
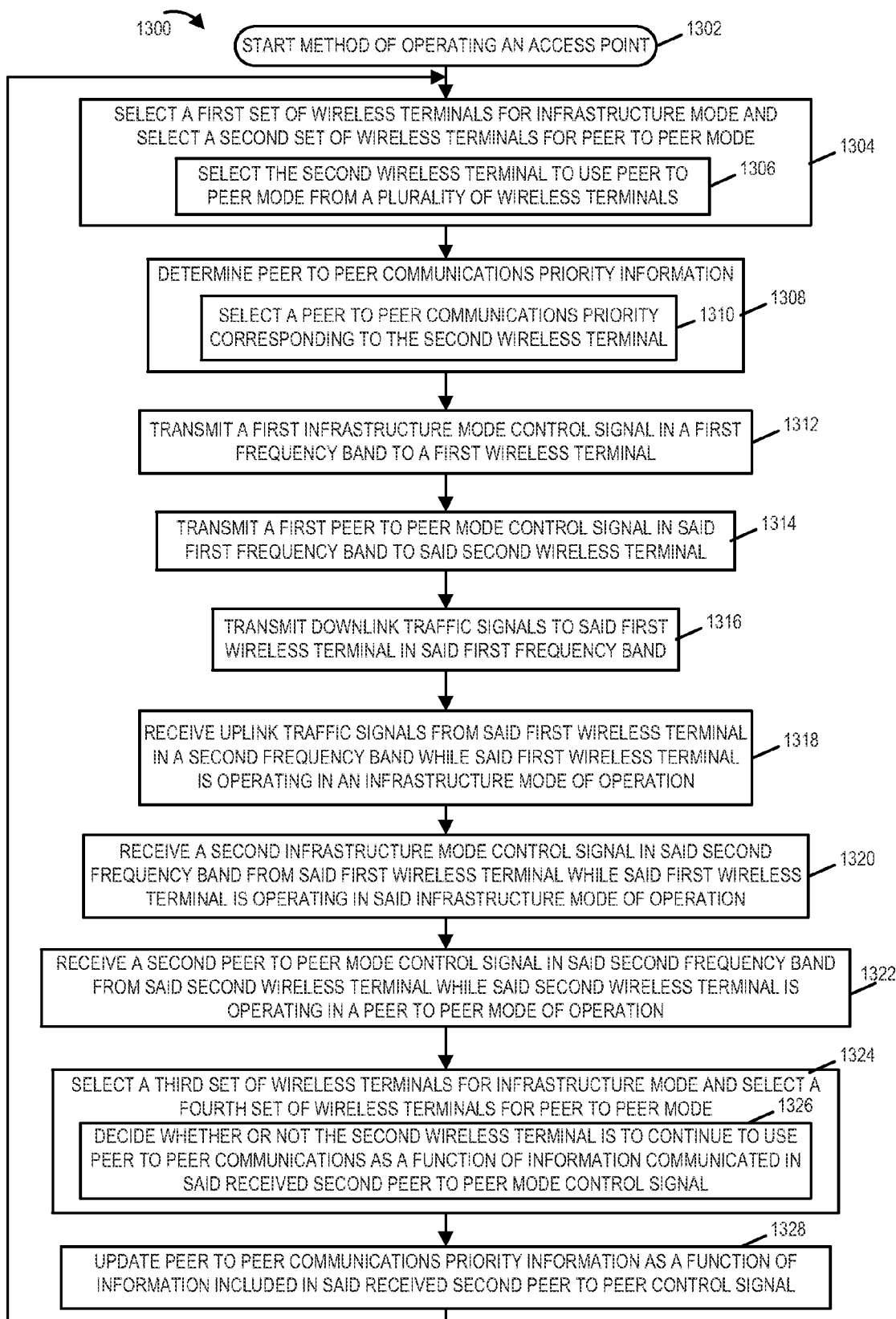
FIG. 13 is a flowchart of an exemplary method of operating an access point, e.g., base station, in accordance with an exemplary embodiment.

FIG. 13 is a flowchart 1300 of an exemplary method of operating an access point, e.g., a base station, in accordance with various exemplary embodiments. The access point implementing the method of flowchart 1300 is, e.g., one of the base stations (102, . . . , 104) of system 100 of FIG. 1. Operation of the exemplary method starts in step 1302 where the access point is powered on and initialized. Operation proceeds from start step 1302 to step 1304. In step 1304 the access point selects a first set of wireless terminals for infrastructure mode, e.g., cellular mode, and selects a second set of wireless terminals for peer to peer mode. Step 1304 includes step 1306 in which the access point selects the second wireless terminal to use peer to peer mode from a plurality of wireless terminals. In various embodiments, the selection of step 1304 is based upon one or more of all of: the locations of the different wireless terminals, the locations of pairs of wireless terminals that have a connection or are likely to desire to have a connection, cellular network loading, peer to peer network loading, cellular interference information, peer to peer network information, traffic data backlog corresponding to the different wireless terminals, power information corresponding to the wireless terminals, and latency information corresponding to the wireless terminals. For example, a pair of wireless terminals which are situated close to one another and which are communicating with one another via the cellular network may be switched from infrastructure mode to peer to peer communications mode, e.g., to reduce cellular traffic loading and/or to reduce the transmission power levels used by the pair of devices for communicating traffic signals. Operation proceeds from step 1304 to step 1308.

In step 1308 the access point determines peer to peer priority information. Step 1308 includes step 1310 in which the access point selects a peer to peer communications priority corresponding to second wireless terminal, e.g., a device priority level and/or a connection priority level corresponding to the second wireless terminal. Operation proceeds from step 1308 to step 1312.

In step 1312 the access point transmits a first infrastructure mode control signal in a first frequency band, e.g., an FDD cellular downlink band, to a first wireless terminal. The first wireless terminal is one of the wireless terminals that the access point has selected to be in the first set of wireless terminals. Operation proceeds from step 1312 to step 1314.

In step 1314 the access point transmits a first peer to peer control signal in said first frequency band to the second wireless terminal. In various embodiments, the first peer to peer control signal is a unicast signal. In some embodiments, the first peer to peer control signal includes peer to peer communications priority information, e.g., a peer to peer communications priority level corresponding to the second communications device. In some such embodiments, the communicated peer to peer priority information is intended to be used by the second communications device in making peer to peer traffic transmission decisions. In some embodiments, the first peer to peer mode control signal communicates a command to use peer to peer communications, e.g., the access point commands the second communications device to use peer to peer communications. In some embodiments, the first peer to peer mode control signal communicates a suggestion to use peer to peer communications, e.g., the access point suggests that the second wireless terminal use peer to peer communications. In some embodiments, the first peer to peer mode control signal communicates information identifying a third frequency band to be used for peer to peer communications. In some such embodiments, the information identifying the third frequency band identifies one of a plurality of alternative frequency bands that may be used for peer to peer communications, and the identified band is to be used for peer to peer communications at the current location of the second wireless terminal at the current time. In some embodiments, the first peer to peer mode control signal communicates information authorizing the second wireless terminal to participate in a peer to peer network. In various embodiments, the first peer to peer mode control signal includes a peer to peer network device identifier to be used by the second wireless terminal. In various embodiments, the first peer to peer mode control signal includes a peer to peer network connection identifier corresponding to a connection in which the second wireless terminal is an endpoint. In some embodiments, the first peer to peer mode control signal communicates peer to peer traffic scheduling information, e.g. the first peer to peer mode control signal communicates a peer to peer traffic segment assignment that is assigned to the second wireless terminal for transmission of peer to peer traffic data signals.

In various embodiments, the first peer to peer control signal is one of a plurality of peer to peer mode control signals transmitted by the access point to the second wireless terminal in the first frequency band, e.g., different peer to peer mode control signals communicating different types of control information. In some embodiments, the first peer to peer mode control signal communicates more than one of: information identifying the third frequency band, a command to use peer to peer communications, a suggestion to use peer to peer communications, authorization to use peer to peer communications, a peer to peer device identifier, a peer to peer connection identifier, peer to peer traffic scheduling information, and peer to peer communications priority information. Operation proceeds from step 1314 to step 1316.

In step 1316 the wireless terminal transmits downlink traffic signals to said first wireless terminal in said first frequency band. Then, in step 1318 the access point receives uplink traffic signals from said first wireless terminal in a second frequency band, e.g., a FDD cellular uplink frequency band, while said first wireless terminal is operating in an infrastructure mode of operation. Operation proceeds from step 1318 to step 1320. In step 1320 the access point receives a second infrastructure mode control signal in said second frequency band from said first wireless terminal while said first wireless terminal is operating in said infrastructure mode of operation. Operation proceeds from step 1320 to step 1322.

In step 1322 the access point receives a second peer to peer mode control signal in said second frequency band from said second wireless terminal while said second wireless terminal is operating in a peer to peer mode of operation. In some embodiments, the second peer to peer mode control signal communicates information about at least one of: peer to peer resource utilization and peer to peer communications backlog information. Operation proceeds from step 1322 to step 1324.

In step 1324 the access point selects a third set of wireless terminals for infrastructure mode and selects a fourth set of wireless terminals for peer to peer mode. Step 1324 includes step 1326 in which the access point decides whether or not the second wireless terminal is to continue to use peer to peer communications as a function of information communicated in said received second peer to peer mode control signal.

Operation proceeds from step 1324 to step 1328. In step 1328 the access point updates peer to peer communications priority information as a function of information included in said received second peer to peer mode control signal. Thus in steps 1324 and 1328 the access point rebalances the communications system in response to received feedback information from the wireless terminals operating in peer to peer mode as well as in response to changing conditions in the different spectrums, e.g., changing the balance of wireless terminals communicating traffic data using the cellular communications and the wireless terminal communicating traffic data using direct peer to peer communications. In addition, the access point readjusts peer to peer priority information in response to the received feedback.

The flowchart may be repeated for multiple iterations and the second communications device may be selected to have different corresponding peer to peer priority levels during different iterations, e.g., as a function of the feedback information communicated in the received second peer to peer mode control signal. During different iterations, different wireless terminals may be selected to participate in peer to peer communications, e.g., as a function of changing locations of the wireless terminals, changing conditions, received peer to peer network feedback information, received cellular network feedback information, monitoring and/or measurements of the cellular network by the access point, and/or monitoring and/or measurements of the peer to peer network by the access point, etc.

In various embodiments, operating a wireless terminal in a peer to peer mode of operation includes using a third frequency band for peer to peer data traffic. In some embodiments, the first, second and third frequency bands are non-overlapping. In some such embodiments, the third frequency band is a TDD band. In some embodiments, the first frequency band is a FDD cellular downlink frequency band and the second frequency band is FDD cellular uplink frequency band.

In some embodiments, peer to peer traffic transmission decisions are made in a distributed manner by the wireless terminals operating in peer to peer mode, e.g., the second wireless terminal makes transmission decisions corresponding to peer to peer traffic slots based on information received from the access point and based on measurements of signals from other wireless terminals and/or based on estimated interference. In some such embodiments, the first peer to peer mode control signal influences the peer to peer traffic transmission decisions which the second wireless terminal makes. For example, in some embodiments, the first peer to peer mode control signal includes peer to peer priority information used by the second wireless terminal in making peer to peer traffic transmission decisions corresponding to a plurality of consecutive peer to peer traffic time slots, and the peer to peer priority information affects yielding decisions, e.g., yielding to higher priority connections to which it estimates that it may cause an unacceptable level of interference if it transmits. In various embodiments, the rate at which the first control signal is transmitted to the second wireless terminal, while the wireless terminal is in peer to peer mode, is less than the rate at which the second wireless terminal makes peer to peer traffic transmission decisions, e.g., the second wireless terminal uses the same received peer to peer priority information when making peer to peer traffic transmission decisions corresponding to a predetermined number of consecutive peer to peer transmission slots.

In some other embodiments, the access point directly schedules wireless terminals to use individual peer to peer traffic segments. In some such embodiments, the first infrastructure mode control signal includes a cellular traffic segment assignment directed to the first wireless terminal, and the first peer to peer mode control signal includes a peer to peer traffic segment assignment directed to the second wireless terminal.

Figure 14:
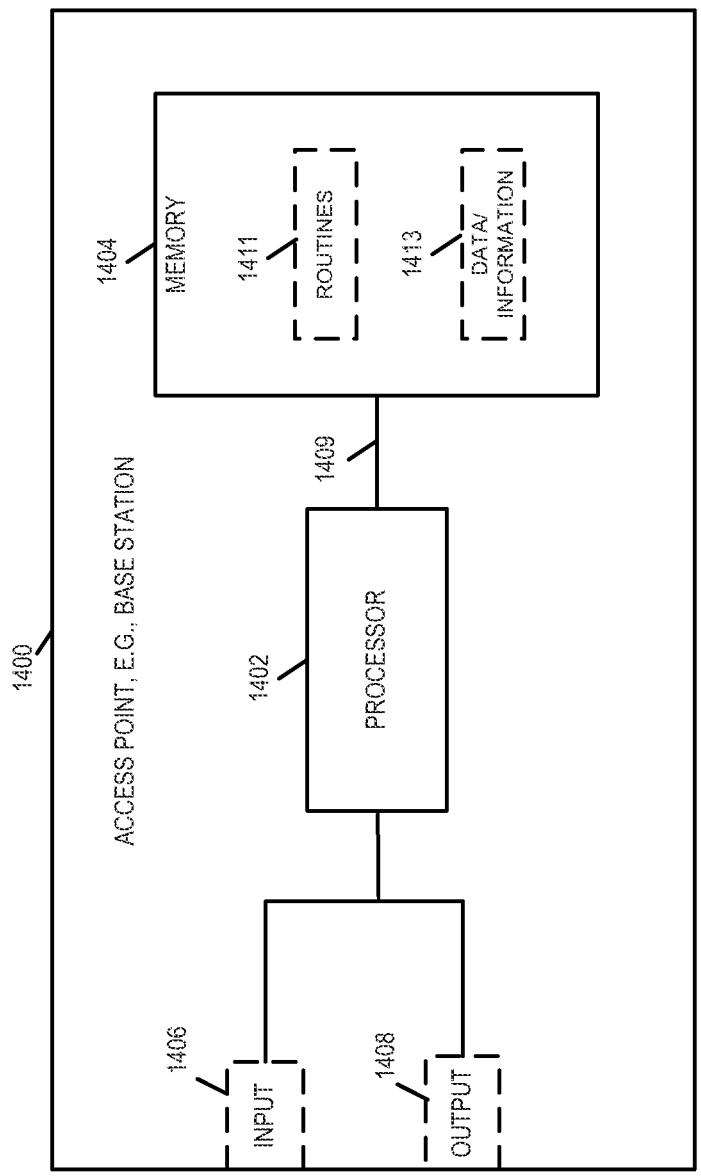
FIG. 14 is a drawing of an exemplary access point, e.g., base station, in accordance with an exemplary embodiment.

FIG. 14 is a drawing of an exemplary access point 1400, e.g., base station, in accordance with an exemplary embodiment. Exemplary access point 1400 is, e.g., one of the base stations (102, . . . , 104) of system 100 of FIG. 1. Exemplary access point 1400 may, and sometimes does, implement a method in accordance with flowchart 1300 of FIG. 13.

Access point 1400 includes a processor 1402 and memory 1404 coupled together via a bus 1409 over which the various elements (1402, 1404) may interchange data and information. Access point 1400 further includes an input module 1406 and an output module 1408 which may be coupled to processor 1402 as shown. However, in some embodiments, the input module 1406 and output module 1408 are located internal to the processor 1402. Input module 1406 can receive input signals. Input module 1406 can, and in some embodiments does, include a wireless receiver and/or a wired or optical input interface for receiving input. Output module 1408 may include, and in some embodiments does include, a wireless transmitter and/or a wired or optical output interface for transmitting output. In some embodiments, memory 1404 includes routines 1411 and data/information 1413.

In some embodiments, processor 1402 is configured to: transmit a first infrastructure mode control signal in a first frequency band to a first wireless terminal; transmit a first peer to peer mode control signal in said first frequency band to a second wireless terminal; receive a second infrastructure mode control signal in a second frequency band from said first wireless terminal while said first wireless terminal is operating in an infrastructure mode of operation; and receive a second peer to peer mode control signal in said second frequency band from said second wireless terminal while said second wireless terminal is operating in a peer to peer mode of operation.

In various embodiments, operating in a peer to peer mode of operation includes using a third frequency band for peer to peer data traffic. In some embodiments, the first, second and third bands are non-overlapping. In some embodiments the third frequency band is a TDD band. In some such embodiments, the first frequency band is a FDD cellular downlink frequency band, and the second frequency band is a FDD cellular uplink frequency band.

In some embodiments the first peer to peer mode control signal communicates peer to peer communications priority information. In some embodiments, the first peer to peer mode control signal communicates a command to use peer to peer communications. In some other embodiments, the first peer to peer mode control signal communicates a suggestion to use peer to peer communications. In various embodiments, the first peer to peer mode control signal communicates information identifying a third frequency band to be used for peer to peer communications.

In some embodiments, the second peer to peer mode control signal communicates information about at least one of: peer to peer communications resource utilization and peer to peer communications backlog information. In various embodiments, processor 1402 is further configured to: select the second wireless terminal to use peer to peer mode from a plurality of wireless terminals, prior to transmitting said first peer to peer mode control signal. In some embodiments, processor 1402 is further configured to: decide whether or not the second wireless terminal is to continue using peer to peer communications as a function of information communicated in said received second peer to peer mode control signal. Processor 1402, in some embodiments, is further configured to: update peer to peer communications priority information as a function of information communicated in said received second peer to peer mode control signal.

In some embodiments, the first peer to peer mode control signal includes peer to peer priority information used by the second wireless terminal in making peer to peer traffic transmission decisions corresponding to a plurality of consecutive peer to peer traffic time slots.

In some embodiments, the first peer to peer mode control signal communicates peer to peer traffic scheduling information. In some such embodiments, processor 1402 is configured to perform traffic segment scheduling for cellular communications traffic segments and for peer to peer traffic segments. In some such embodiments, said first infrastructure mode control signal includes a cellular traffic segment assignment directed to the first wireless terminal, and wherein said first peer to peer mode control signal includes a peer to peer traffic segment assignment directed to the second wireless terminal.

In some embodiments, when a wireless terminal is operating in infrastructure mode its control signaling with the access point is at a faster rate than when it operating in peer to peer mode. In some such embodiments, the infrastructure control signaling rate is at least 4 times the peer to peer control signaling rate. In some such embodiments, processor 1402 is configured to change and control the rates at which downlink control signals are transmitted to a wireless terminal as a function of whether the wireless terminal is operating in infrastructure mode of peer to peer mode. In some embodiments processor 1402 is also configured to change and control the rates at which uplink control signals are received from a wireless terminal as a function of whether the wireless terminal is operating in infrastructure mode of peer to peer mode.

Figure 15:
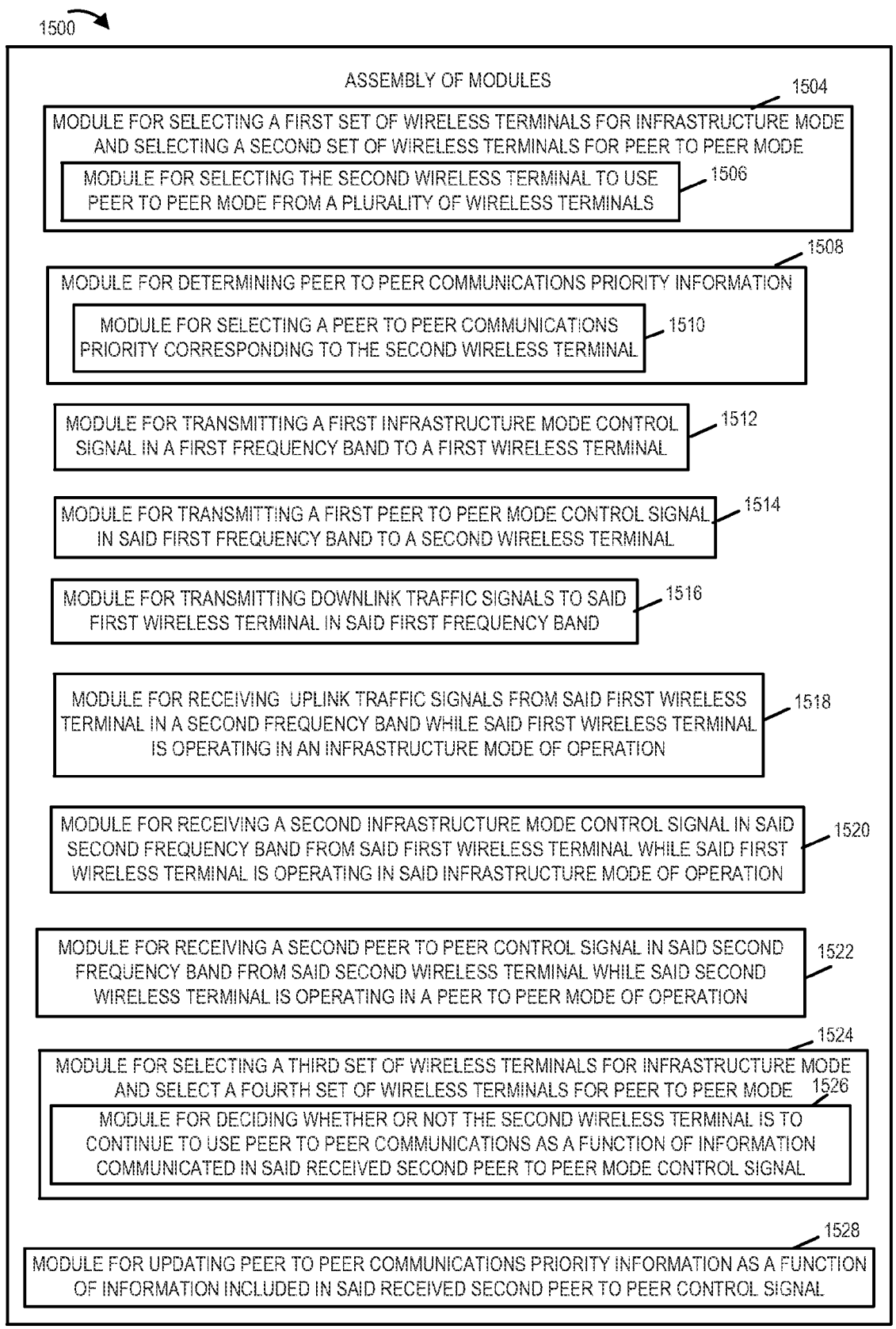
FIG. 15 is an assembly of modules which can, and in some embodiments is, used in the exemplary wireless communications device illustrated in FIG. 3.

FIG. 15 is an assembly of modules 1500 which can, and in some embodiments is, used in the exemplary access point 1500 illustrated in FIG. 15. The modules in the assembly 1500 can be implemented in hardware within the processor 1402 of FIG. 14, e.g., as individual circuits. Alternatively, the modules may be implemented in software and stored in the memory 1404 of access point 1400 shown in FIG. 14. In some such embodiments, the assembly of modules 1500 is included in routines 1411 of memory 1404 of device 1400 of FIG. 14. While shown in the FIG. 14 embodiment as a single processor, e.g., computer, it should be appreciated that the processor 1402 may be implemented as one or more processors, e.g., computers. When implemented in software the modules include code, which when executed by the processor, configure the processor, e.g., computer, 1402 to implement the function corresponding to the module. In some embodiments, processor 1402 is configured to implement each of the modules of the assembly of modules 1500. In embodiments where the assembly of modules 1500 is stored in the memory 1404, the memory 1404 is a computer program product comprising a computer readable medium, e.g., a non-transitory computer readable medium, comprising code, e.g., individual code for each module, for causing at least one computer, e.g., processor 1402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 15 control and/or configure the access point 1400 or elements therein such as the processor 1402, to perform the functions of the corresponding steps illustrated and/or described in the method of flowchart 1300 of FIG. 13.

Assembly of modules 1500 includes a module 1504 for selecting a first set of wireless terminal for infrastructure mode and a second set of wireless terminal for peer to peer mode, a module 1508 for determining peer to peer communications priority information, a module 1512 for transmitting a first infrastructure mode control signal in said first frequency band to a first wireless terminal, a module 1514 for transmitting a first peer to peer mode control signal in said first frequency band to a second wireless terminal, a module 1516 for transmitting downlink traffic signals to said first wireless terminal in said first frequency band, and a module 1518 for receiving uplink traffic signals from said first wireless terminal in a second frequency band while said first wireless terminal is operating in an infrastructure mode of operation. Module 1504 includes a module 1506 for selecting the second wireless terminal to use peer to peer mode from a plurality of wireless terminals. Module 1508 includes a module 1510 for selecting a peer to peer communications priority corresponding to the second wireless terminal.

Assembly of module 1500 further includes a module 1520 for receiving a second infrastructure mode control signal in said second frequency band from said first wireless terminal, while said first wireless terminal is operating in said infrastructure mode of operation, a module 1522 for receiving a second peer to peer control signal in said second frequency band from said second wireless terminal while said second wireless terminal is operating in a peer to peer mode of operation, a module 1524 for selecting a third set of wireless terminals for infrastructure mode and selecting a fourth set of wireless terminals for peer to peer mode, and a module 1528 for updating peer to peer communications priority information as a function of information included in said received second peer to peer control signal. Module 1524 includes a module 1526 for deciding whether or not the second wireless terminal is to continue to use peer to peer communications as a function of information communicated in said received second peer to peer mode control signal. Module 1528, may update the peer to peer priority level corresponding to the second wireless terminal if module 1526 decides that the second wireless terminal is to continue operating in peer to peer mode, e.g., increasing its priority level in response to a large traffic backlog, or increasing its priority level in response to an increasing traffic backlog, or increasing its priority in response to a backlog of delay sensitive traffic, etc.

Various embodiments are directed to ways that a WAN/cellular system can be deployed in an FDD spectrum while peer to peer communications can take place using a portion of spectrum allocated for TDD signaling. In accordance with one embodiment, devices in the WAN/cellular network, e.g., access nodes, e.g., base stations, and/or network control devices send control signals using the FDD spectrum to enable and control peer to peer communication taking place in TDD spectrum. In one such implementation there are three distinct communications bands being used an FDD uplink band, an FDD downlink band and a TDD band used for peer to peer communications.

In various embodiments, the WAN/cellular network can employ different degrees of control on the peer to peer communication. One example of control is that the WAN can suggest which mobiles can use peer to peer communication and then those mobiles can participate in a peer to peer style connection scheduling mechanism wherein peer to peer signal transmission decisions may be made in a distributed manner by the nodes participating in peer to peer communications. Another example is that the WAN can control the priorities being used by the devices participating in peer to peer communications, e.g., on a per link basis, while the peer to peer devices compete for communications resources, e.g., the right to use peer to peer traffic segments, as part of a distributed connection scheduling process. In still another example, the WAN directly controls peer to peer data traffic scheduling in the TDD. In various embodiments, the mobiles participating in the peer to peer communications transmit control signals to the WAN, e.g., communicating resource utilization information and/or peer to peer backlog information which can be used to update peer to peer control. For example, in some embodiments, an access point use the received feedback information regarding the peer to peer network to decide which mobiles to suggest to use peer to peer communications in the future and/or to set and/or update peer to peer priority information.

Figure 16:
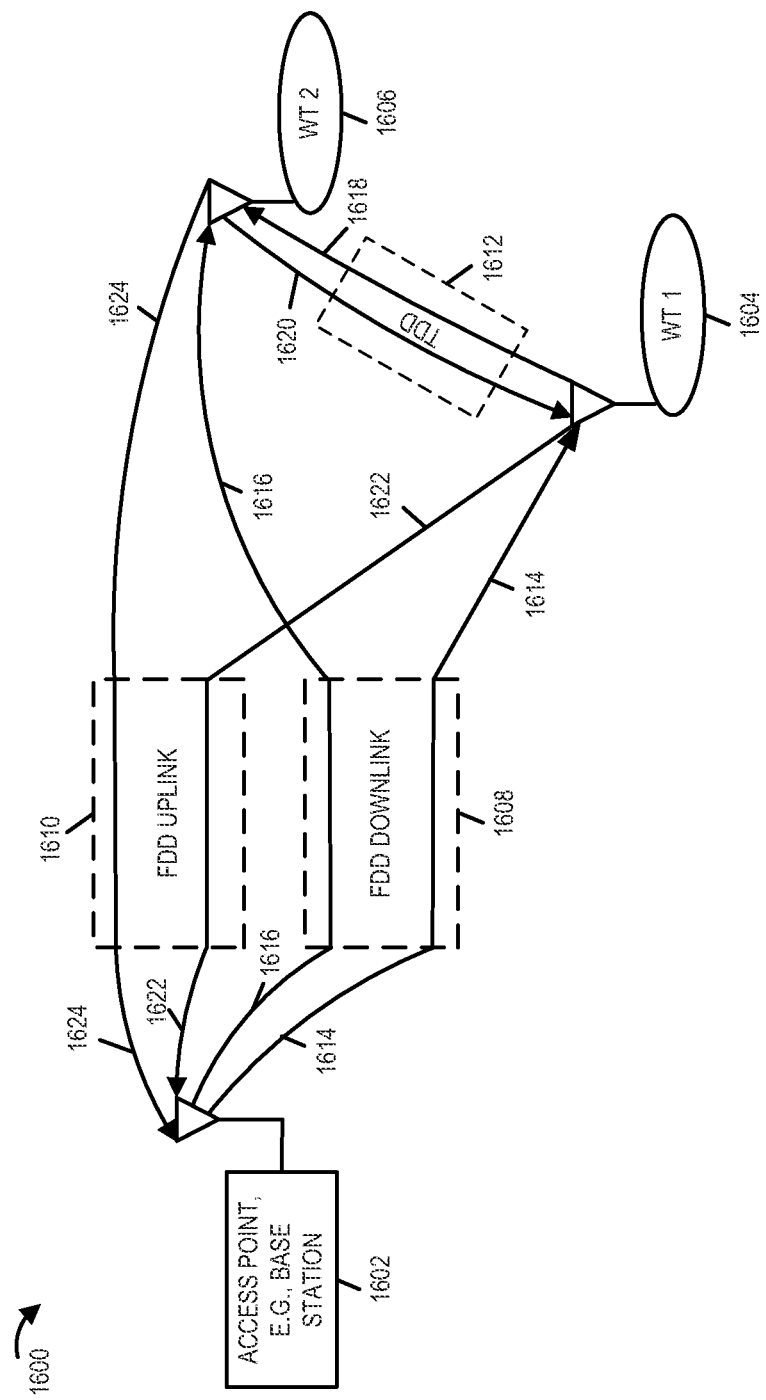
FIG. 16 illustrates an exemplary access point and exemplary wireless terminals communicating in accordance with an exemplary embodiment in which the access point asserts some control over peer to peer communications.

Drawing 1600 of FIG. 16 illustrates an exemplary access point 1602, e.g., base station, and exemplary wireless terminals (WT 1 1604, WT 2 1606) communicating in accordance with an exemplary embodiment in which the access point asserts some control over the peer to peer communications. The exemplary access point 1602 is, e.g., access point 1400 of FIG. 14 which implements a method in accordance with flowchart 1300 of FIG. 13. The exemplary wireless terminals (1604, 1606) are, e.g., wireless terminals implemented in accordance with wireless communications device 300 of FIG. 3 which implement a method in accordance with flowchart 200 of FIG. 2 or implemented in accordance with wireless communications device 1200 of FIG. 12 which implements a method in accordance with flowchart 1000 of FIG. 10.

The access point 1602 is part of a WAN which uses FDD downlink band 1608 and FDD uplink band 1610 for cellular WAN communications including cellular WAN control signaling and cellular WAN traffic signaling. In this example, the WAN also exerts control over the TDD band 1612 which is used for peer to peer signaling, e.g., direct peer to peer signaling including peer to peer traffic signaling. The FDD downlink band 1608, FDD uplink band 1610, and the TDD band 1612, in this exemplary embodiment are non-overlapping.

Access point 1602 transmits controls signals 1614 to WT 1 1604 on the FDD downlink band 1608 to assert control over peer to peer communications in TDD band 1612 in regard to WT 1 1604. In various embodiments, at least some of the control signals in signals 1614 are unicast signals. Various types of information communicated in signals (1614, 1616) include, e.g., one or more of: a command to use peer to peer communications, a suggestion to use peer to peer communications, authorization to use peer to peer communications, a peer to peer device identifier, a peer to peer connection identifier, information identifying the TDD band 1612, information identifying a portion of the TDD band 1612, peer to peer device priority information, peer to peer connection priority information, a peer to peer traffic transmission request response, and a peer to peer traffic segment assignment.

Access point 1602 transmits controls signals 1616 to WT 2 1606 on the FDD downlink band 1608 to assert control over peer to peer communications in TDD band 1612 in regard to WT 2 1606. In various embodiments, at least some of the control signals in signals 1616 are unicast signals.

WT 1 1604 transmits peer to peer signals 1618 to WT 2 1606 on TDD band 1612. Peer to peer signals 1618 include peer to peer data traffic signals. In some embodiments, peer to peer signals 1618 also include peer to peer data traffic scheduling control signals, e.g., peer to peer traffic transmission request signals and/or peer to peer traffic transmission request response signals.

WT 2 1606 transmits peer to peer signals 1620 to WT 1 1604 on TDD band 1612. Peer to peer signals 1620 include peer to peer data traffic signals. In some embodiments, peer to peer signals 1620 also include peer to peer data traffic scheduling control signals, e.g., peer to peer traffic transmission request signals and/or peer to peer traffic transmission request response signals.

WT 1 1604 transmits control signals 1622 regarding peer to peer communications to the access point 1602 on the FDD uplink band 1610. WT 2 1606 transmits control signals 1624 regarding peer to peer communications to the access point 1602 on the FDD uplink band 1610. Various types of information communicated in signals (1622, 1624) include, e.g., one or more or all of: peer to peer communications resource utilization information, peer to peer communications backlog information, peer to peer interference information, peer to peer transmission power information, peer to peer device identification information, a peer to peer connection request, a peer to peer traffic transmission request, peer to peer traffic statistical information, e.g., success/fail information, traffic transmission queue information, delay information, and traffic transmission yielding information.

Information received in signals (1622, 1624), may be, and sometimes is, used by the access point 1602 in making decisions regarding control over the peer to peer TDD band 1612, e.g., deciding which wireless terminals should use peer to peer communications in the future and setting peer to peer communication priority information for the future.

In various embodiments a device, e.g., a wireless terminal (114, 115, 116, 118, 120) of FIG. 1 or wireless communications device 300 of FIG. 3, or a wireless terminal (504, 506, 508, 510, 512, 514, 516, 518) of FIG. 6-9, or a wireless communications device 1100 of FIG. 11, or a wireless terminal (1604, 1606) of FIG. 16 includes a module corresponding to each of the individual steps and/or operations described with regard to any of the Figures in the present application and/or described in the detailed description of the present application. In various embodiments a device, e.g., a base station (102, 104) of FIG. 1, or a base station 502 FIG. 6-9, or an access point 1400, e.g., base station, of FIG. 14, or an access point 1602 of FIG. 16 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes such as location determination server nodes, mobile nodes such as mobile terminals, access points such as base stations serving as location anchor points, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Various embodiments are well suited to location determination in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device, the method comprising:
   receiving, at a first wireless device, a first control signal from a base station on a first spectrum;
   determining, by the first wireless device, whether or not to send a peer to peer communications signal to a second wireless device in a second spectrum based on said first control signal and information received in one or more traffic scheduling signals received from other communications devices participating in peer to peer communications, said second spectrum being different from said first spectrum; and
   sending a second control signal to the base station on a third spectrum, said third spectrum being different than first and second spectrums.

2. The method of claim 1,
   wherein said first spectrum is a FDD downlink spectrum used by a cellular network;
   wherein said second spectrum is a TDD spectrum used for peer to peer communications; and
   wherein said third spectrum is an FDD uplink spectrum used by the cellular network.

3. The method of claim 2, wherein said first, second and third spectrums do not overlap.

4. The method of claim 1, wherein said base station is part of said cellular network and wherein said first control signal from said base station provides peer to peer communications priority information.

5. The method of claim 4, wherein said second control signal provides information about at least one of communications resource utilization or peer to peer communications backlog information to said base station for use in determining an updated peer to peer communications priority.

6. The method of claim 5, wherein said step of determining whether or not to send a peer to peer communications signal to a second wireless communications device in a second spectrum is a peer to peer transmission decision which is made by said wireless communications device based on the peer to peer priority information received in said first control signal.

7. A wireless communications device comprising:
   means for receiving, at the wireless communications device, a first control signal from a base station on a first spectrum;
   means for determining, by the wireless communications device, whether or not to send a peer to peer communications signal to a second wireless device in a second spectrum based on said first control signal and information received in one or more traffic scheduling signals received from other communications devices participating in peer to peer communications, said second spectrum being different from said first spectrum; and
   means for sending a second control signal to the base station on a third spectrum, said third spectrum being different than first and second spectrums.

8. The wireless communications device of claim 7,
   wherein said first spectrum is a FDD downlink spectrum used by a cellular network;
   wherein said second spectrum is a TDD spectrum used for peer to peer communications; and
   wherein said third spectrum is an FDD uplink spectrum used by the cellular network.

9. The wireless communications device of claim 8, wherein said first, second and third spectrums do not overlap.

10. The wireless communications device of claim 7, wherein said base station is part of said cellular network and wherein said first control signal from said base station provides peer to peer communications priority information.

11. A computer program product for use in a wireless communications device, the computer program product comprising:
    a non-transitory computer readable medium comprising:
       code for causing at least one computer to receive a first control signal from a base station on a first spectrum;
       code for causing said at least one computer to determine whether or not to send a peer to peer communications signal to a second wireless device in a second spectrum based on said first control signal and information received in one or more traffic scheduling signals received from other communications devices participating in peer to peer communications, said second spectrum being different from said first spectrum; and
       code for causing said at least one computer to send a second control signal to the base station on a third spectrum, said third spectrum being different than first and second spectrums.

12. A wireless communications device comprising:
    at least one processor configured to:
       receive, at the wireless communications device, a first control signal from a base station on a first spectrum;
       determine, by the wireless communications device, whether or not to send a peer to peer communications signal to a second wireless device in a second spectrum based on said first control signal and information received in one or more traffic scheduling signals received from other communications devices participating in peer to peer communications, said second spectrum being different from said first spectrum; and send a second control signal to the base station on a third spectrum, said third spectrum being different than first and second spectrums; and memory coupled to said at least one processor.

13. The wireless communications device of claim 12, wherein said first spectrum is a FDD downlink spectrum used by a cellular network;
wherein said second spectrum is a TDD spectrum used for peer to peer communications; and
wherein said third spectrum is an FDD uplink spectrum used by the cellular network.

14. The wireless communications device of claim 13, wherein said first, second and third spectrums do not overlap.

15. The wireless communications device of claim 12, wherein said base station is part of said cellular network and wherein said first control signal from said base station provides peer to peer communications priority information.

16. A method of operating an access point, the method comprising:
transmitting a first infrastructure mode control signal in a first frequency band to a first wireless terminal;
transmitting a first peer to peer mode control signal in said first frequency band to a second wireless terminal;
receiving a second infrastructure mode control signal in a second frequency band from said first wireless terminal while said first wireless terminal is operating in an infrastructure mode of operation; and
receiving a second peer to peer mode control signal in said second frequency band from said second wireless terminal while said second wireless terminal is operating in a peer to peer mode of operation, the second wireless terminal determining to operate in the peer to peer mode of operations based on the first peer to peer mode control signal and information received in one or more traffic scheduling signals received from other wireless terminals participating in peer to peer communications.

17. The method of claim 16, wherein operating in a peer to peer mode of operation includes using a third frequency band for peer to peer data traffic.

18. The method of claim 17, wherein said first, second and third bands are non-overlapping.

19. The method of claim 18, wherein said third frequency band is a TDD band.

20. The method of claim 19, wherein the first frequency band is a FDD cellular downlink frequency band, and wherein the second frequency band is a FDD cellular uplink frequency band.

21. The method of claim 16, wherein said first peer to peer mode control signal communicates peer to peer communications priority information.

22. An access point, comprising:
means for transmitting a first infrastructure mode control signal in a first frequency band to a first wireless terminal;
means for transmitting a first peer to peer mode control signal in said first frequency band to a second wireless terminal;
means for receiving a second infrastructure mode control signal in a second frequency band from said first wireless terminal while said first wireless terminal is operating in an infrastructure mode of operation; and
means for receiving a second peer to peer mode control signal in said second frequency band from said second wireless terminal while said second wireless terminal is operating in a peer to peer mode of operation, the second wireless terminal determining to operate in the peer to peer mode of operations based on the first peer to peer mode control signal and information received in one or more traffic scheduling signals received from other wireless terminals participating in peer to peer communications.

23. The access point of claim 22, wherein operating in a peer to peer mode of operation includes using a third frequency band for peer to peer data traffic.

24. The access point of claim 23, wherein said first, second and third bands are non-overlapping.

25. The access point of claim 24, wherein said third frequency band is a TDD band.

26. A computer program product for use in an access point, the computer program product comprising:
a non-transitory computer readable medium comprising:
code for causing at least one computer to transmit a first infrastructure mode control signal in a first frequency band to a first wireless terminal;
code for causing said at least one computer to transmit a first peer to peer mode control signal in said first frequency band to a second wireless terminal;
code for causing said at least one computer to receive a second infrastructure mode control signal in a second frequency band from said first wireless terminal while said first wireless terminal is operating in an infrastructure mode of operation; and
code for causing said at least one computer to receive a second peer to peer mode control signal in said second frequency band from said second wireless terminal while said second wireless terminal is operating in a peer to peer mode of operation, the second wireless terminal determining to operate in the peer to peer mode of operations based on the first peer to peer mode control signal and information received in one or more traffic scheduling signals received from other wireless terminals participating in peer to peer communications.

27. An access point comprising:
at least one processor configured to:
transmit a first infrastructure mode control signal in a first frequency band to a first wireless terminal;
transmit a first peer to peer mode control signal in said first frequency band to a second wireless terminal;
receive a second infrastructure mode control signal in a second frequency band from said first wireless terminal while said first wireless terminal is operating in an infrastructure mode of operation; and
receive a second peer to peer mode control signal in said second frequency band from said second wireless terminal while said second wireless terminal is operating in a peer to peer mode of operation, the second wireless terminal determining to operate in the peer to peer mode of operations based on the first peer to peer mode control signal and information received in one or more traffic scheduling signals received from other wireless terminals participating in peer to peer communications; and
memory coupled to said at least one processor.

28. The access point of claim 27, wherein operating in a peer to peer mode of operation includes using a third frequency band for peer to peer data traffic.

29. The access point of claim 28, wherein said first, second and third bands are non-overlapping.

30. The access point of claim 29, wherein said third frequency band is a TDD band.

* * * * *